(12) United States Patent
Shah et al.

(10) Patent No.: US 12,095,852 B2
(45) Date of Patent: Sep. 17, 2024

(54) SCALABLE PROCESSING OF DOMAIN NAME SYSTEM QUERIES FOR A GLOBAL SERVER LOAD BALANCING SERVICE

(71) Applicant: Goldman Sachs & Co. LLC, New York, NY (US)

(72) Inventors: Rushit Shah, London (GB); James Lesworth, London (GB)

(73) Assignee: Goldman Sachs & Co. LLC, New York, NY (US)

( * ) Notice: Subject to any disclaimer, the term of this patent is extended or adjusted under 35 U.S.C. 154(b) by 0 days.

(21) Appl. No.: 18/222,290

(22) Filed: Jul. 14, 2023

(65) Prior Publication Data

US 2024/0022628 A1 Jan. 18, 2024

Related U.S. Application Data

(60) Provisional application No. 63/470,140, filed on May 31, 2023, provisional application No. 63/389,791, filed on Jul. 15, 2022.

(51) Int. Cl.
| | |
|---|---|
| *G06F 15/173* | (2006.01) |
| *G06F 9/48* | (2006.01) |
| *G06F 9/50* | (2006.01) |
| *H04L 61/4511* | (2022.01) |

(Continued)

(52) U.S. Cl.
CPC ........ *H04L 67/1008* (2013.01); *G06F 9/4881* (2013.01); *G06F 9/5083* (2013.01); *H04L 61/4511* (2022.05); *H04L 67/1012* (2013.01)

(58) Field of Classification Search
None
See application file for complete search history.

(56) References Cited

U.S. PATENT DOCUMENTS

| | | | |
|---|---|---|---|
| 2010/0322071 A1* | 12/2010 | Avdanin | H04L 47/215 370/230 |
| 2011/0153810 A1 | 6/2011 | Raja et al. | |
| 2019/0199790 A1 | 6/2019 | Yang et al. | |

(Continued)

FOREIGN PATENT DOCUMENTS

WO     WO 2016/181383 A2     11/2016

OTHER PUBLICATIONS

PCT International Search Report and Written Opinion, PCT Application No. PCT/IB2023/057243, Oct. 20, 2023, nine pages.

*Primary Examiner* — Wing F Chan
*Assistant Examiner* — Andrew Woo
(74) *Attorney, Agent, or Firm* — Fenwick & West LLP

(57) ABSTRACT

A system performs efficient domain name system (DNS) based global server load balancing. The system regularly monitors server health of servers that process requests directed to virtual servers. The update server health information is used to process DNS queries that request assignment of servers for processing requests directed to virtual servers. The system maintains metadata describing servers based on user requests associated with virtual servers. The system updates information stored in a database based on requests associated with a virtual server, for example, create, update, or delete information describing a virtual server. The system propagates the updated information to a plurality of data plane clusters. The system receives DNS queries and answers them based on the updated information describing the servers.

20 Claims, 23 Drawing Sheets

(51) Int. Cl.
H04L 67/1008 (2022.01)
H04L 67/1012 (2022.01)

(56) References Cited

U.S. PATENT DOCUMENTS

2020/0382390 A1 12/2020 Basavaiah et al.
2022/0029881 A1 1/2022 Aharon et al.

* cited by examiner

| Nimbus Home | My Namespaces Scratch | Administration | Nimbus GO | Nimbus v1 |

| CP/DP Interaction | Namespace | Cache | Backup | Service | Health Checks | Notifications |

Use the button below to trigger a health check for a combined view of the overall health of the control plane. The check takes about 10 seconds to complete.

⚠ Note: This is an instance specific resource so please ensure you are using the correct instance when using this function i.e. You may get different results depending on which host/instance you connect to.

[Enter keyword to search]

[Perform Health Check]

1102

| Status | Health Check Type |
|---|---|
| ⊘ | Audit Processing Thread Alive Health Check |
| ⊘ | Cpu Used Health Check |
| ⊘ | Data Plane Site Synchronized Health Check |
| ⊘ | Disk Space Used Health Check |

1105

1108

| Details |
|---|
| • OK: Audit change stream processing thread is alive and well. Last processed serial ID: ☐ |
| • OK: Average CPU used for host ☐.com, is less than 80%. Average CPU used (sampled over 10s): 5.0% |
| • OK: Data plane site, ☐ is in sync with the control plane with a delta of 0 entries. Delta Threshold:150, Control Plane Serial ID:☐ Site Serial ID:☐ |
| • OK: Data plane site, ☐ is in sync with the control plane with a delta of 0 entries. Delta Threshold: 150, Control Plane Serial ID:☐ Site Serial ID:☐ |
| • OK: Data plane site, ☐ is in sync with the control plane with a delta of 0 entries. Delta Threshold: 150, Control Plane Serial ID:☐ Site Serial ID:☐ |
| • OK: Data plane site, ☐ is in sync with the control plane with a delta of 0 entries. Delta Threshold: 150, Control Plane Serial ID:☐ Site Serial ID:☐ |
| • OK: Data plane site, ☐ is in sync with the control plane with a delta of 0 entries. Delta Threshold: 150, Control Plane Serial ID:☐ Site Serial ID:☐ |
| • OK: Data plane site, ☐ is in sync with the control plane with a delta of 0 entries. Delta Threshold: 150, Control Plane Serial ID:☐ Site Serial ID:☐ |
| • OK: Disk space used for host, ☐ com, for [/] is less than 80% Space used: 37.0%<br>• OK: Disk space used for host, ☐ com, for ☐ is less than 80%. Space used: 2.0%<br>• OK: Disk space used for host, ☐ com, for[/] ☐ is less than 80%. Space used: 2.0%<br>• OK: Disk space used for host, ☐ com, for ☐ is less than 80%. Space used: 33.0% |

FIG. 11A

Nimbus  Home  My Namespaces  Scratch  Administration  Nimbus GO  Nimbus v1

Welcome to Nimbus!

Nimbus is a DNS based GSLB (Global Server Load Balancing) solution

Within a few seconds, you can use Nimbus to create aliases (virtual servers) for back-ends running your services (real servers) and load balance traffic them by region, health, weighted or any combination of these.

[Go to My Namespaces] [Visit the playground to have a go]

Nimbus has 3 main concepts:

- Namespace: A namespace is a grouping or container for virtual servers. Namespaces are used primarily as a way to maintain ownership and as such are tied to AppDir entities. You must therefore have the appropriate permission in AppDir to create/update/delete virtual servers under a given namespace. Additionally, the namespace name will always be part of the alias e.g.
- Virtual Server: A virtual server, vserver, (or alias) represents the "vanity" name for one or more real servers.
- Real Server: A real server, rserver, is the target endpoint (host name, IP address or another Nimbus alias) e.g d1234-001.dc.gs.com or 1.1.1.1. It can have health check, region or weight metadata associated with it to control whether or not it should be returned as an answer to a DNS query.

You can visit the playground using the button above to create test virtual servers in seconds! For our advanced users, check out the quick actions below.

For more information, API documentation, support or to provide feedback, please choose the appropriate option when clicking on the question mark icon in the top right corner of this page.

Quick Actions

You can use the below sections to perform various quick actions.

[Create Namespace]  — 1112
[Create Virtual Server]  — 1114
[Update Weight]  — 1118

FIG. 11B

Nimbus Home  My Namespaces  Scratch  Administration  Nimbus GO  Nimbus v1

Home / My Namespaces / Namespace X

Audit Health Check States

You can view all the audit entries for this virtual server below. For updates, values shown are the field values before the update. By default, all audit entries are fetched for the last 30 days. You can adjust this using the filters.

| Timestamp ↓ | Serials | Action | User | Namespace Name | Virtual Server Name |
|---|---|---|---|---|---|

Enter keyword to search 🔍 dd/mm/yyyy 📅   dd/mm/yyyy 📅   Apply Filters ↻

1152      1154

| Timestamp ↓ | Serials | Action | User |
|---|---|---|---|
| List of timestamps | List of serials | Delete Real Server | srushi |
| | | Delete Real Server | srushi |
| | | Delete Real Server | srushi |
| | | Delete Real Server | srushi |
| | | Delete Real Server | srushi |

| Namespace Name | Virtual Server Name |
|---|---|
| List of namespace names | List of virtual server names |

| Real Server Set Name | Real Server Weight | Type | Real Server Region | Real Server Building | Real Server Health Check Type | Real Server Health Check Data |
|---|---|---|---|---|---|---|
| List of real server set names | 1 | | List of real server regions | | HTTP_FETCH | |
| | 1 | | | | HTTP_FETCH | |
| | 1 | | | | HTTP_FETCH | |
| | 1 | | | | HTTP_FETCH | |
| | 1 | | | | HTTP_FETCH | |

| Real Server Data |
|---|
| List of real servers |

| Real Server Health Check Data |
|---|
| List of real server health check data |

FIG. 11E

Nimbus Home My Namespaces Scratch Administration Nimbus GO Nimbus v1

Home / My Namespaces / [ ] Namespace x

Virtual Server Details | Audit | Health Check States

You can view all the health check state audit entries for this virtual server below. Note that you will only see entries here when state changes. By default, all audit entries are fetched for the last 30 days. You can adjust this using the filters.

1172

[ ▽ dd/mm/yyyy ] [ 📅 ] [ ▽ dd/mm/yyyy ] [ 📅 ] [ Apply Filters ] ↻

Delete Virtual Server

| State | Timestamp ↓ | Namespace Name | Virtual Server Name | Site | Error Message | Real Server ID |
|---|---|---|---|---|---|---|
| ⊙ UP | List of timestamps | List of namespace names | List of virtual server names | List of sites | | List of real server IDs |
| ⊙ UP | | | | | | |
| ⊙ UP | | | | | | |
| ⊙ UP | | | | | | |
| ⊙ UP | | | | | | |
| ⊙ DOWN | | | | | Connection refused | |

| Real Server Data | Real Server Set Name | Real Server Weight | Real Server Region | Real Server Building | Real Server Health Check Type | Real Server Health Check Type |
|---|---|---|---|---|---|---|
| List of real server data | 2 | 1 | AMERICAS | | HTTP_FETCH | List of real server health check data |
| | 2 | 1 | AMERICAS | | HTTP_FETCH | |
| | 2 | 1 | AMERICAS | | HTTP_FETCH | |
| | 2 | 1 | AMERICAS | | HTTP_FETCH | |
| | 2 | 1 | AMERICAS | | HTTP_FETCH | |
| | 2 | 1 | AMERICAS | | HTTP_FETCH | |

FIG. 11G

SCALABLE PROCESSING OF DOMAIN NAME SYSTEM QUERIES FOR A GLOBAL SERVER LOAD BALANCING SERVICE

CROSS-REFERENCE TO RELATED APPLICATION

This application claims the benefit of U.S. Provisional Application No. 63/389,791, filed on Jul. 15, 2022, and U.S. Provisional Application No. 63/470,140, filed on May 31, 2023, each of which is hereby incorporated by reference in its entirety.

TECHNICAL FIELD

The subject matter described relates generally to load balancing of servers and more specifically to a domain name system (DNS) based global server load balancing service.

BACKGROUND

Domain name system (DNS) load balancing of distributes traffic across more than one server to improve performance and availability. Organizations use different forms of load balancing to speed up websites and private networks. Without load balancing, web applications and websites are not able to handle traffic effectively. DNS translates website domains (e.g., www.xyz.com) into network addresses, for example, IP (internet protocol) addresses. A DNS server receives a DNS query that requests an IP address for a domain. DNS load balancing configures a domain in a domain name system (DNS) such that client requests to the domain are distributed across a group of server machines. A domain can correspond to a website, a mail system, a print server, or another service. Poor DNS load balancing results in slow performance of requests by overloading certain servers and low server utilization by not sending enough requests to some of the servers to utilize them effectively by keeping them busy.

SUMMARY

A system performs efficient domain name system (DNS) based global server load balancing. The system regularly monitors server health of servers that process requests directed to virtual servers. The update server health information is used to process DNS queries that request assignment of servers for processing requests directed to virtual servers.

According to an embodiment, the system maintains metadata describing servers based on user requests associated with virtual servers. The virtual server is identified by a uniform resource locator (URL) and requests to the virtual server are processed by one or more servers from a plurality of servers. The system receives a request associated with a virtual server, for example, create, update, or delete information describing a virtual server. The system updates information stored in a database based on the request. The database stores records mapping virtual servers to servers. The system propagates the updated information to a plurality of data plane clusters. Each data plane cluster comprises a database for storing metadata describing the plurality of servers.

The system periodically updates one or more measures of server health for each of a plurality of servers. The measures of server health are updated for each of the plurality of data plane clusters. A measure of server health is relative to a location within the data plane cluster and is associated with a communication protocol for reaching the server from a computing device in the location. For example, the communication protocol associated with a measure of health of a server may be one of tcp (transmission control protocol), http (hypertext transfer protocol), or https (hypertext transfer protocol secure), or icmp (internet control message protocol). The system uses the information describing the server health for processing DNS queries. Accordingly, the system receives, from a client device, a DNS query requesting a server for processing requests directed to the URL of a particular virtual server. The system identifies, based on information stored in a DNS cache, one or more candidate servers for processing requests directed to the URL of the particular virtual server. The system selects a candidate server from the one or more candidate servers based on factors comprising a measure of server health of the server, and a location associated with the client device. The system sends a response to the DNS query to the client device. The response identifies the candidate server for processing requests directed to the URL of the virtual server.

According to an embodiment, the system monitors server health of the servers used for processing requests directed to virtual servers and uses the monitored health information to respond to DNS queries. The system identifies a plurality of servers, each server associated with a virtual server. For example, the system may receive a request associated with a virtual server identified by a uniform resource locator (URL), and update information stored in a database based on the request, wherein the database comprises records mapping virtual servers to servers. The request may be to create, update, or delete metadata information for a virtual server. The system creates a plurality of server health check tasks. Each server health check task is for determining a measure of server health of a server with respect to a location. Each measure of server health is associated with a communication protocol for reaching the server from a computing device in the location. A communication protocol associated with a measure of health of a server may be one of tcp, http, https, or icmp. The system divides the plurality of server health check tasks into a sequence of a plurality of buckets of tasks.

The system monitors health of the plurality of servers by repeating a set of steps periodically. The system processes the plurality of server health check tasks within a time interval. The time interval comprises a plurality of time subintervals. The plurality of buckets of tasks are processed in order of the sequence, each bucket of tasks processed during a time subinterval assigned to the bucket. The processing of a bucket of tasks comprises following steps. The system sends each server health check task to a worker process associated with a communication protocol. The worker process determines a measure of server health of a server by communicating with the server using a communication protocol of the worker process. The system receives results of server health checks from the worker processes, and propagates the results of server health checks to a plurality of data plane clusters. The system processes DNS queries, each DNS query requesting a server for processing requests directed to a virtual server. The system processes an DNS query by selecting a server based on the server health check results.

The techniques disclosed may be implemented as computer-implemented methods, as non-transitory computer readable storage media comprising instructions that when executed by one or more computer processors, cause the one or more computer processors to perform steps of methods disclosed herein, or as computer systems comprising, one or more computer processors and a non-transitory computer readable storage medium comprising instructions that when executed by one or more computer processors, cause the one or more computer processors to perform steps of the methods disclosed herein.

BRIEF DESCRIPTION OF THE DRAWINGS

FIG. 11A illustrates aspects of a user interface for an administration health check view, according to one embodiment.

FIG. 11B illustrates aspects of a home page of a user interface, according to one embodiment.

FIG. 11E illustrates aspects of a user interface for a virtual server audit view, according to one embodiment.

FIG. 11G illustrates aspects of a user interface for a virtual server health check state view, according to one embodiment.

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

DETAILED DESCRIPTION

Figure 1:
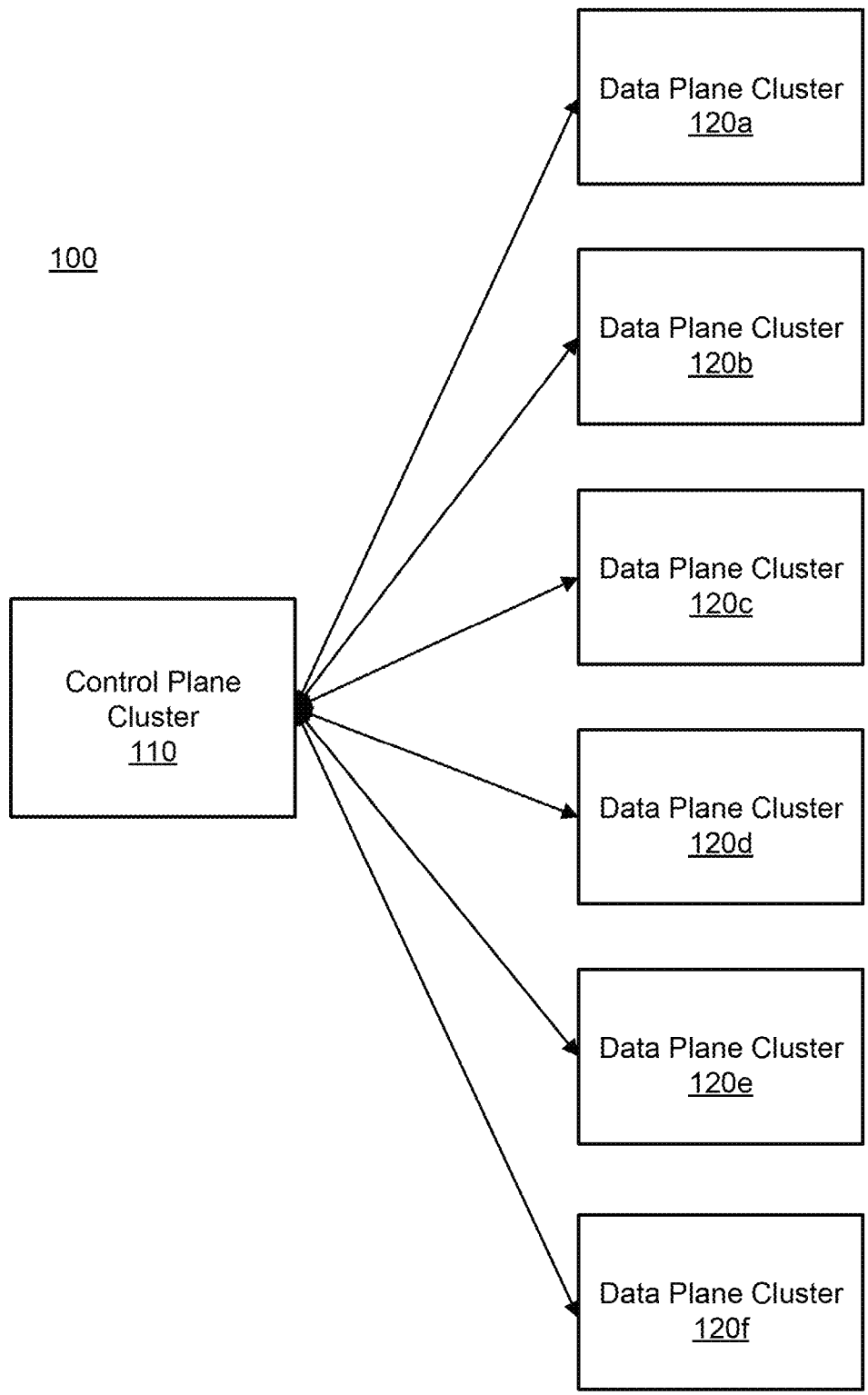
FIG. 1 illustrates an overall system environment of a DNS based global server load balancing service, according to an embodiment.

FIG. 1 illustrates an overall system environment of a DNS based global server load balancing service, according to an embodiment. The load balancing system 100 allows users to efficiently create virtual servers for backends running services on physical servers. The load balancing system performs load balancing of traffic to virtual servers by region, health, weight, or any combination of these. The load balancing system includes control plane implemented as a control plane cluster 110 and a data plane implemented as plurality of data plane clusters 120a, 120b, 120c, 120d, 120e, 120f, and so on. A reference to the control plane herein corresponds to the control plane cluster 110. A reference to a data plane herein corresponds to a data plane cluster 120.

Different data plane clusters may be implemented in different geographical regions. For example, data plane clusters 120a and 120b may be in one continent, whereas data plane clusters 120c and 120d may be in a different continent. The control plane processes change requests coming into the system via application programming interface (API) requests or user interfaces (UI) requests. The data plane is responsible for various functions including: (1) Providing records to clients. (2) Performing health checks against target backends. (3) Syncing up data from the control plane. (4) Providing health check status changes, and so on. Each data plane cluster 120 is a complete fully functioning version of the data plane which operates independently. The system implements various types of load balancing mechanisms, for example, weight based load balancing, or other types of load balancing. The system performs health checks so that if a server is down, the system does not return that server as result of DNS queries so that requests are not sent to that server. The system can be configured to allow responses from a particular region.

The system performs a DNS-based load balancing that aims to provide load balancing through DNS resolution. The system receives a DNS query from an application and processes it to map a received domain name or alias to an IP address that is provided as a result of the DNS query and used by the application to connect to a server. This is distinct from traditional load balancers that intercept traffic, for example, network load balancers. The system receives a request from an application, for example, a browser such as Chrome. The request may be for making a connection to a target domain or alias, for example, www.xyz.com. The application attempts to resolve the alias by executing a DNS query. The DNS query may be forwarded to a caching server. If the cache does not have an answer for the DNS query, the system forwards the request to an authority server. The system executes the query to determine a network address (e.g., IP address) that is provided as the result of the query. The application connects directly to the target server through this network address.

The system may perform different types of load balancing, for example, round-robin load balancing, set-based load balancing, or other types of load balancing. The system implements a DNS round-robin load balancing strategy by using a DNS resource record set that has a number of IP addresses that are cycled for each DNS request returned by the DNS caching infrastructure. This provides a uniform near-time distribution across a number of IP addresses, because the caching layer has all of the information from all of the servers in that set and is able to provide a load balanced response for each query.

FIG. 1 uses like reference numerals to identify like elements. A letter after a reference numeral, such as "120A," indicates that the text refers specifically to the element having that particular reference numeral. A reference numeral in the text without a following letter, such as "140," refers to any or all of the elements in the figures bearing that reference numeral. For example, "140" in the text refers to reference numerals "120A," "120B," and/or "120N" in the figures.

The various systems shown in FIG. 1 communicate via a network. The network provides communication channels via which the other elements of the networked computing environment can communicate. The network can include any combination of local area and wide area networks, using wired or wireless communication systems. In one embodiment, the network uses standard communications technologies and protocols. For example, the network can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, some or all of the communication links of the network may be encrypted using any suitable technique or techniques.

Figure 2:
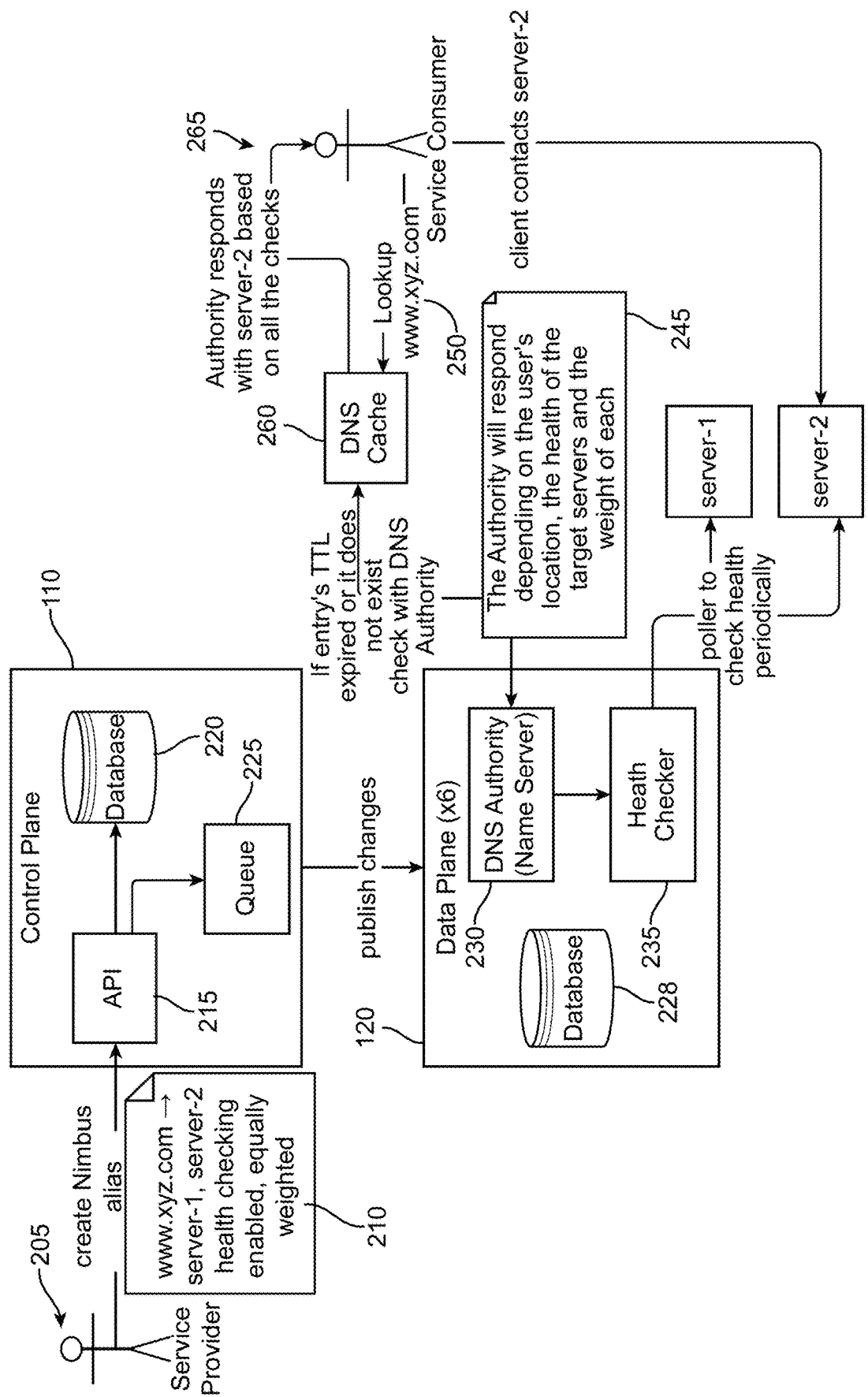
FIG. 2 shows an example of traffic flow with set-based load balancing according to an embodiment.

FIG. 2 shows an example of traffic flow with set-based load balancing according to an embodiment. The control plane cluster 110 (also referred to as the control plane) receives a request 210 from a service provider 205 to associate a virtual server alias with real servers, for example, server-1 and server-2. A real server is also referred to herein as a server. The request 210 may be received from a user interface (UI) or API. The request 210 may be logged in a database 220 for auditing purposes and is added to a queue 225, for example, RabbitMQ™. The request is handled by a data plane cluster 120 and processed by an authority server 230. The authority server 230 interacts with a health checker 235 that polls various servers including server-1 and server-2. The authority server 230 responds 245 based on various factors including the user's location, health of target servers, and weight associated with each server. Once the virtual server alias is associated with a real server, for example, server-2, the mapping is stored in one or more DNS cache 260. A client 265 may perform a DNS query to lookup 250 the virtual server alias. Depending on the DNS cache 260 that processes the request, the client 265 receives the server (e.g., server-2) associated with the virtual server alias. According to an embodiment, the weight of a server is configurable and may be assigned by a user. However, in other embodiments, the system may automatically determine the weight based on various factors such as the type of machine on which the server is running, the speed of the network connection to the server, and so on.

Figure 3A:
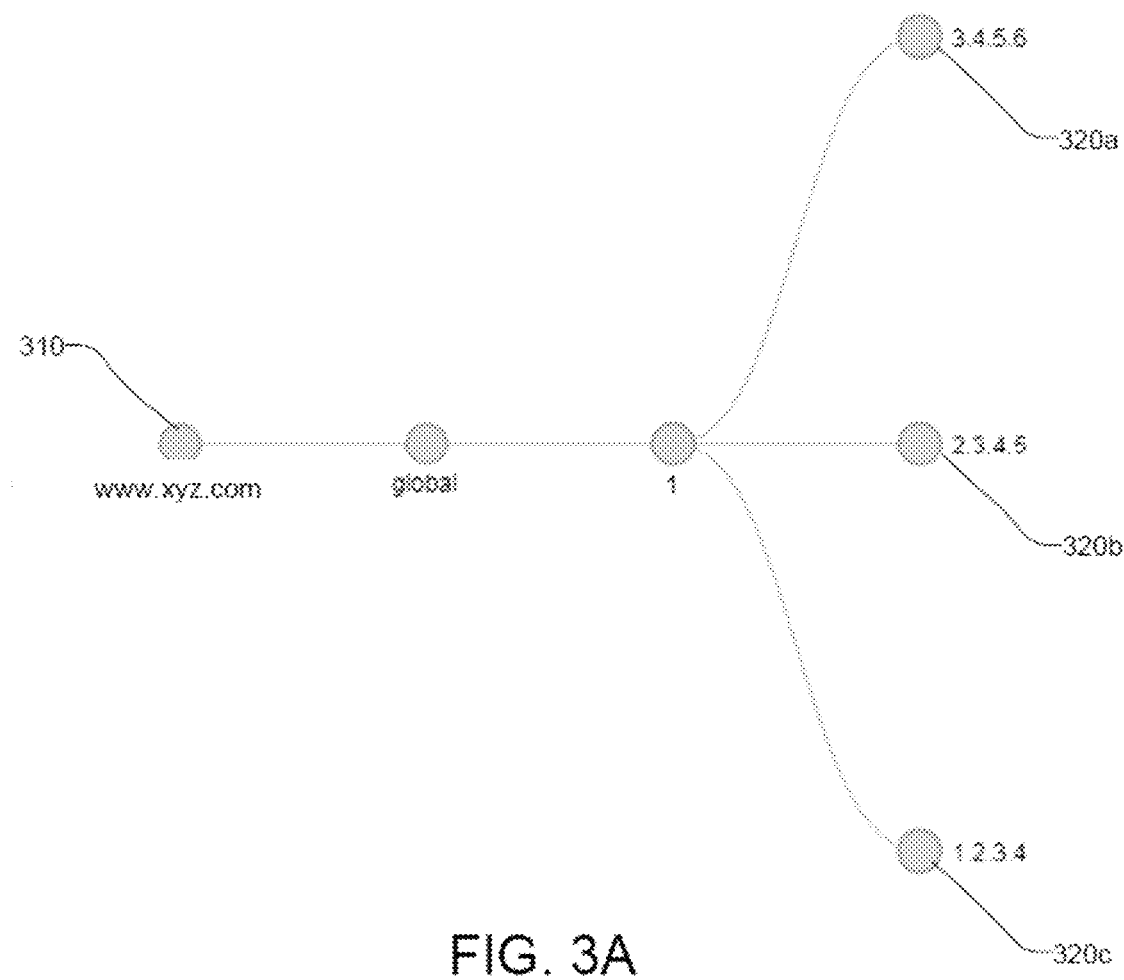
FIG. 3A shows an example screenshot of a user interface illustrating a virtual server mapped to real servers identified using IP addresses, according to an embodiment.
Figure 8:
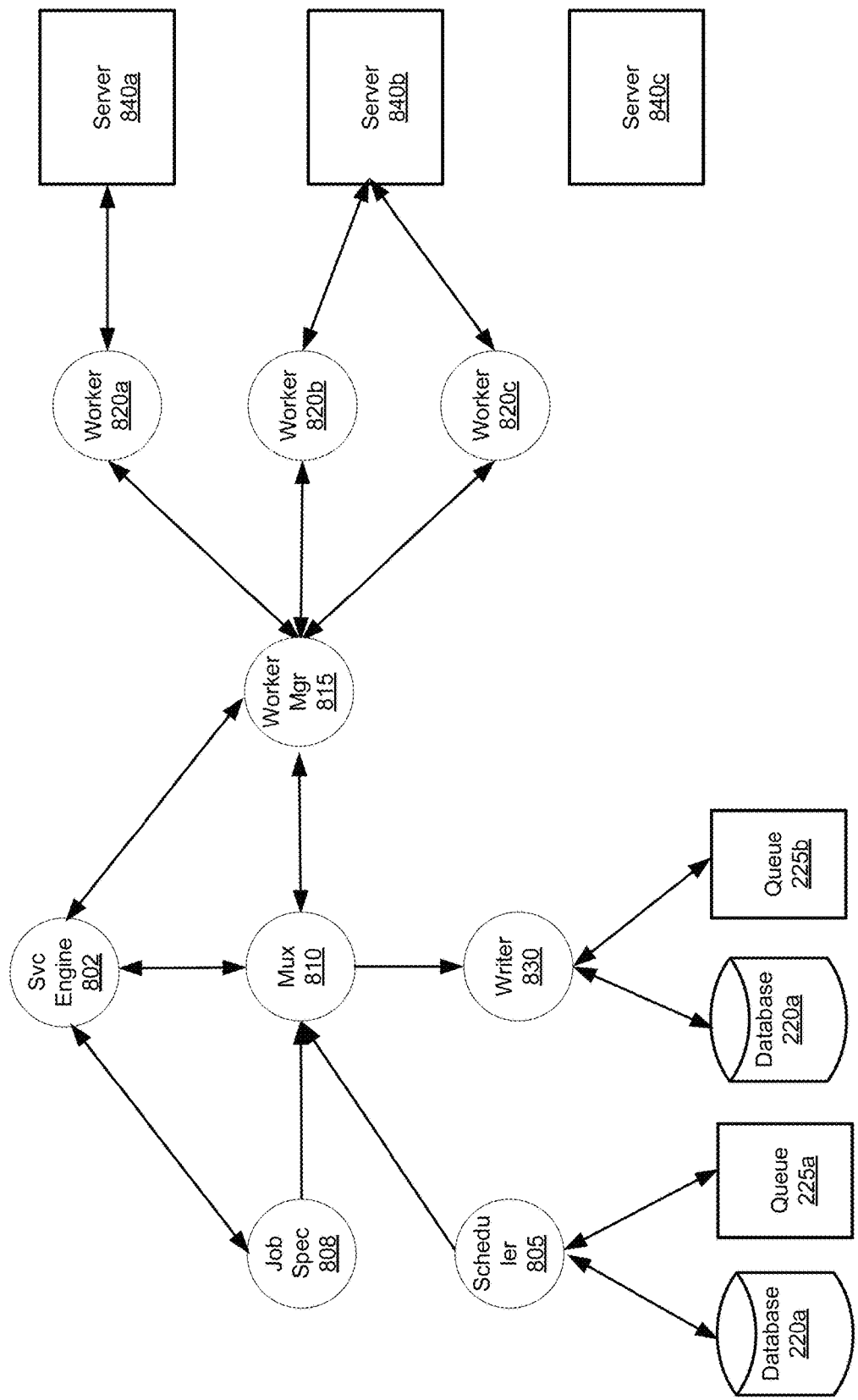
FIG. 8 shows the overall flow of the server health checking system according to an embodiment.

FIG. 3A shows an example screenshot of a user interface illustrating a virtual server mapped to real servers identified using IP addresses, according to an embodiment. To create a virtual server with round-robin load balancing, the system creates real servers with the same set name. The drawback of this approach is that the system can only use IP addresses in the set and cannot use host names or combine IPs with host names in the set. As shown in FIG. 8, the virtual server 215 is mapped to tree real servers 220a, 220b, 220c.

The system also supports set-based load balancing that allows use of host names in sets assigned to virtual servers. The system creates more than one set within a location. According to an embodiment, clients make DNS queries against a DNS caching infrastructure. The system may configure records with a default time to live (TTL) value of T seconds (e.g., 5 seconds). Every T second, the cache forwards requests to an authority server which responds back with one of the sets associated with the virtual server. This response is then cached for T seconds. During that T-second period, any client querying that cache gets the same set as the answer.

Figure 3B:
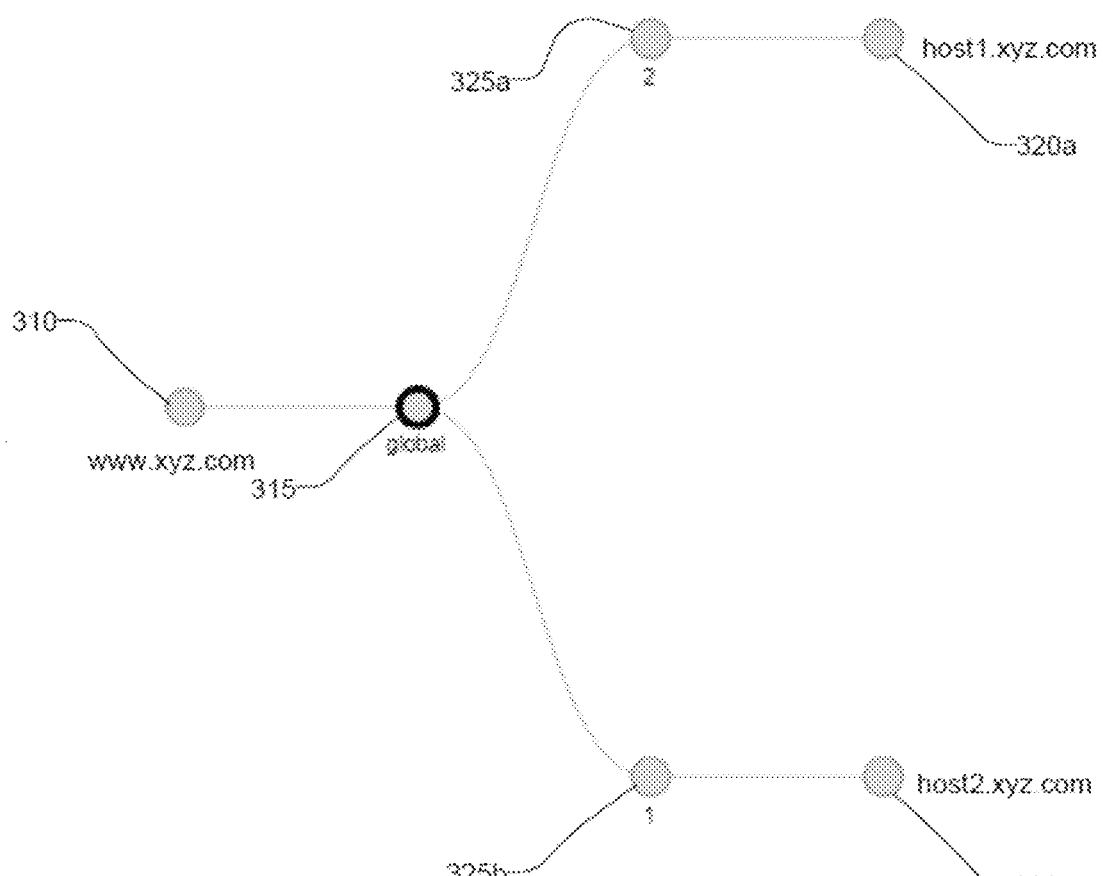
FIG. 3B shows an example screenshot of a user interface illustrating a virtual server mapped to real servers identified using hostnames, according to an embodiment.

FIG. 3B shows an example screenshot of a user interface illustrating a virtual server mapped to real servers identified using hostnames, according to an embodiment. As shown in FIG. 3, a virtual server 310 is mapped to two real servers 320a, 320b identified using hostnames. However, unlike round-robin DNS load balancing, there are two sets, S1 and S2. Each set has a single hostname-based real server within it. The virtual host is assigned to a region 315 that is global but could be Americas, emea, asia, and so on. Each set has a weight indicated as 325A, 325B. Each circle shown in the user interface corresponding to entities such as virtual host, real host, region, and so on indicates a health of the entity. For example, a green circle may indicate good health and a red circle may indicate poor health.

Figure 3C:
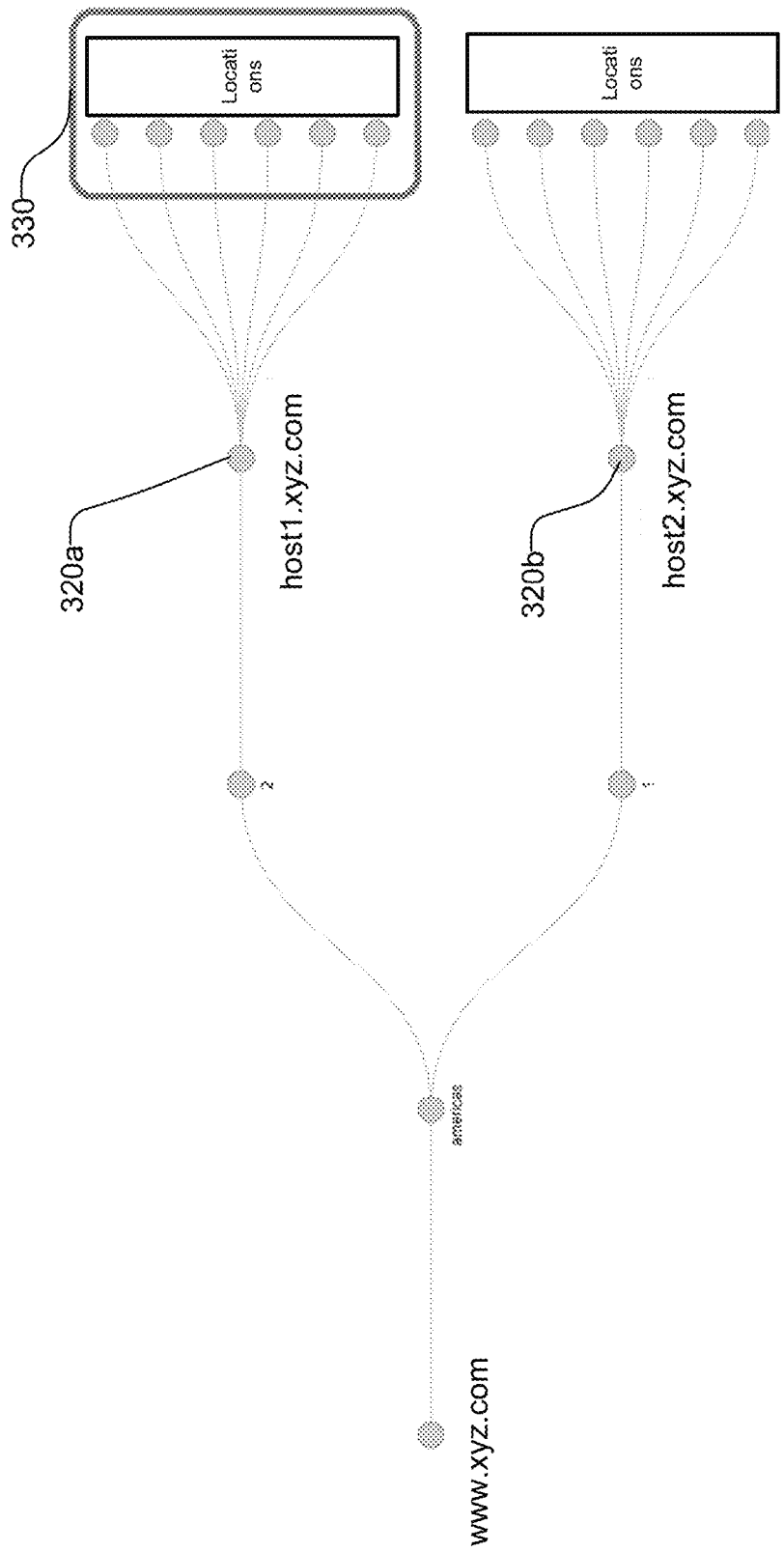
FIG. 3C shows another example screenshot of a user interface illustrating a virtual server mapped to real servers identified using hostnames, according to an embodiment.

FIG. 3C shows another example screenshot of a user interface illustrating a virtual server mapped to real servers identified using hostnames, according to an embodiment. FIG. 3C illustrates that the health of the real servers 320A, 320B is relative to each data plane cluster illustrated in the set of data plane clusters 330. The health of the real servers may be relative to locations within each data plane cluster, for example, buildings. Accordingly, the health of the same real server may be different from two different data plane clusters. Similarly, the health of the real server may be different from two different locations within the same data plane cluster.

Figure 4A:
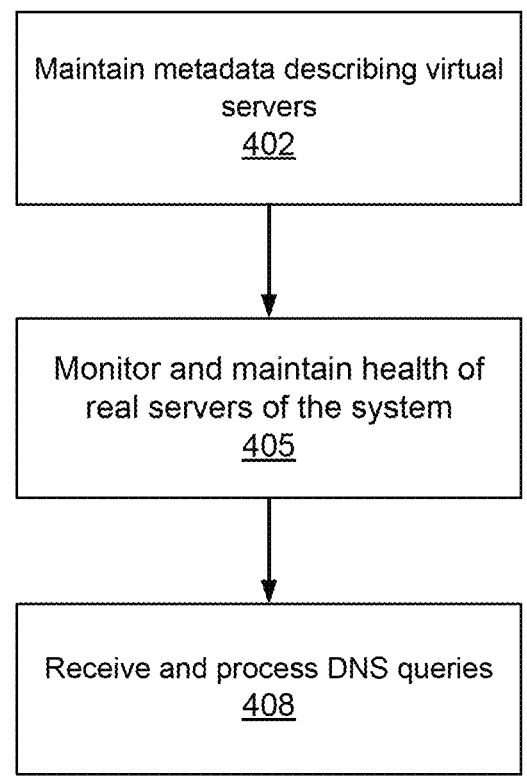
FIG. 4A is a flowchart illustrating the overall process for processing DNS queries according to an embodiment.

FIG. 4A is a flowchart illustrating the overall process for processing DNS queries according to an embodiment. The system maintains 402 metadata describing virtual servers. The control plane 110 of the system receives requests associated with a virtual server, for example, create, update, and delete requests and updates the metadata describing the metadata describing the virtual server in the database 220. The metadata of the control plane is propagated to the data planes. The health checker 235 of the data plane 120 of the system monitors and maintains 405 health of various real servers of the system. The data plane 120 of the system receives and processes DNS queries based on the metadata and the health of the real servers.

The details of the step 402 are further illustrated in FIG. 4B and described in connection with FIG. 4B. The details of the step 405 are illustrated in FIG. 8 and described in connection with FIG. 8. The details of the step 408 are illustrated in FIG. 4C and described in connection with FIG. 4C.

Figure 4B:
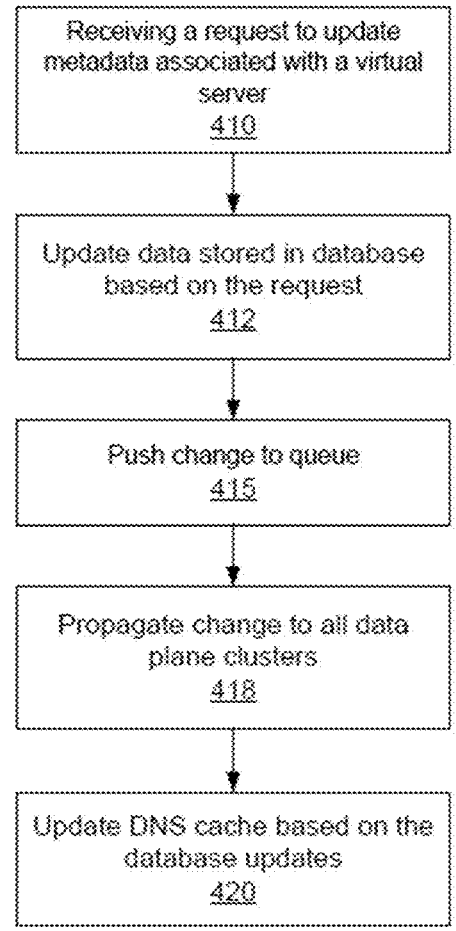
FIG. 4B is a flowchart illustrating the process for maintaining metadata describing virtual servers, according to an embodiment.
Figure 4C:
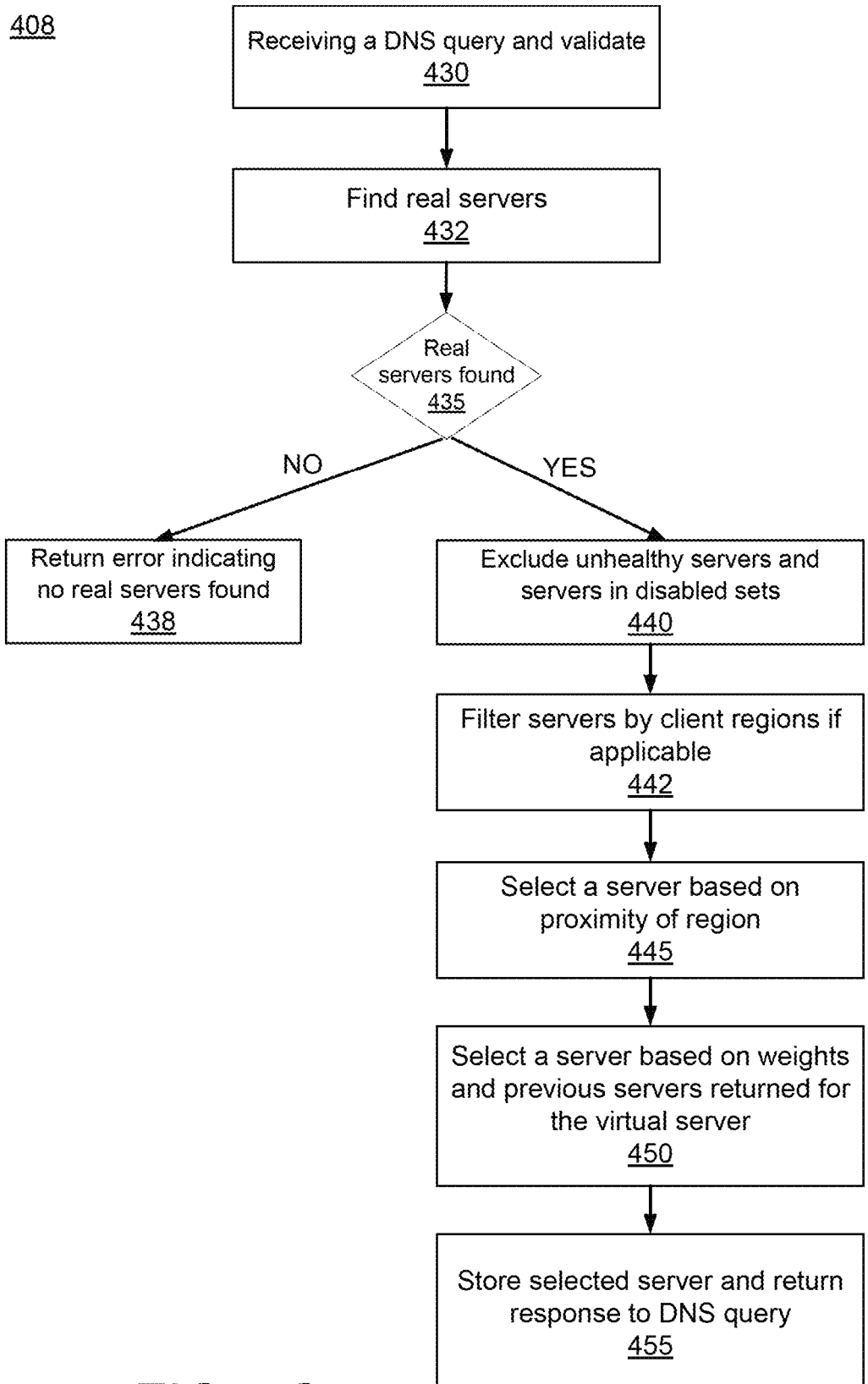
FIG. 4C shows a flowchart illustrating the process for processing DNS queries according to an embodiment.

FIG. 4B is a flowchart illustrating the process for maintaining metadata describing virtual servers, according to an embodiment. The process illustrated in FIG. 4B provides details of step 402 of FIG. 4A.

The control plane 110 receives 410 a request via UI or API to update metadata describing virtual servers, for example, requests to create a new virtual server, request to modify an existing virtual server, or request to delete an existing virtual server. The system updates 412 data stored in the database 220 based on the request. If the request received is a request to create a new virtual server, the system adds new records associated with the new virtual server to the database 220. If the request received is a request to modify a new virtual server, the system modifies the records associated with the virtual server in the database 220. If the request received is a request to delete a virtual server, the system deletes records associated with the virtual server from the database 220.

A record comprises metadata describing a real server associated with a virtual server, for example, a real server ID; a record type (whether the record is real server is represented using an IP address or hostname); record data (the actual IP address or host name corresponding to the real server); a set name; a set weight; a region (global, americas, emea, asia) where the real server exists; a location, for example, a datacenter name where the real server is maintained, a zone in a cloud platform, a building name where the real server is maintained (an enumerated value identifying the location); a health check type representing a type of network communication or communication protocol used to check health of the real server, for example, none, icmp (internet control message protocol that supports ping operations), tcp (transmission control protocol), http (hypertext transfer protocol), or https (hypertext transfer protocol secure); the health check data representing the value received from the real server in response to the health check request; the time health was last checked; current state of the real server (UP, DOWN, DISABLED); and so on.

The control plane pushes the updates to the records to the queue 225. The changes to the records are propagated 418 to the various data planes. As a result, a subset of data stored in the database 220 that is relevant to answering DNS queries is sent to the data planes and stored in the database 228 of the data plane. The data planes update 420 the DNS cache based on the database updates to the records. The data stored in the DNS cache is used for processing DNS queries.

If a DNS authority server receives a request to resolve an alias, the DNS authority server provides a response based on a number of factors: The weight for the real servers, the health status of the real servers (if health checks are enabled), and the location of the calling client. Traffic may also be directed to a real server (despite having a down health check or a zero (0) weight) because of the use of DNS. DNS records are looked up through caches and every DNS record has a TTL, for example, five seconds. Accordingly, depending on when a client last looked up that record and which DNS cache was hit, the client might still get a down (or zero-weighted) record because the record was cached.

There can be a number of factors affecting which target-backend server is provided in the DNS query response when users attempt to resolve the virtual server aliases. This is because of the DNS caching layer. For example, assume that there is a virtual server with a weight of 2:1 for two real servers and health checks are enabled for those real servers. The health of servers observed by the system may be different from actual health. For example, if there's a network delay, the system may observe servers as unhealthy because of the delay in reaching the servers even if the servers are healthy. Assuming that the servers are healthy, as observed by the system, regardless of their actual health, the first and second query to the DNS authority server result in the first real server returned as a response. Assume that the third query to the DNS authority server results in the second real server being returned as a response. That response is cached by the DNS cache, and any new clients that attempt to use that alias (that happen to go through that same caching server) get that response for the next five seconds (as this is the TTL for Nimbus records).

Furthermore, there may be multiple (e.g., 12) authority servers that may respond to the user query, each of which may be in various stages of iteration for balancing the real server's weight, as well as hundreds of caching servers, all of which may be at various stages of TTLs for that record. As a result, the system may return different results depending on the context.

The system allows regional routing for mapping virtual server aliases to real servers. According to an embodiment, the system uses the location of the user/client device that sent the request to decide which server to provide in response to a DNS query. The system determines the location of the user (or the client device from which the request was received) by detecting a location of the DNS cache from which the request was forwarded from. The system also has a database of every subnet deployed across an enterprise and its location. When a request comes into the system, the system fetches the source IP of that DNS request (usually the DNS cache IP address) and calculates the subnet of that IP and determines the location of the client device based on the location associated with the subnet.

The system relies on the DNS caching infrastructure to make decisions about the locations of users. If a local or regional set of DNS caches are down, the system may misinterpret the location of the user and provide an answer for a different region than expected.

FIG. 4C shows a flowchart illustrating the process for processing DNS queries according to an embodiment. The system receives 430 a DNS query and validates the DNS query. The DNS query may specify a virtual server and request for a real server for processing requests directed to the virtual server. The system finds 432 all real servers for the virtual server. If the system determines 435 that no real servers were found, the system returns 438 an error indicating that no real servers were found for the virtual server specified.

If the server finds one or more real servers, the system identifies a real server by performing the following steps. The system excludes 440 real servers that are known to be unhealthy based on the health checks performed. The system also excludes 440 servers if a set in which the server belongs is disabled or has zero weight (or any value of weight indicating that the set should not be used). If there are multiple regions associated with the set, the system filters the servers based on regions to identify only servers that match the region of the client sending the request. If more than one real server or sets of real servers remain, the system selects 445 servers having regions that are within proximity of the region of the client. According to an embodiment, the system stores routing plans for regions. If all of the servers for a given region are down or not available, and the service provider configured the system to use regional routing with health checks, the system users a set of another region to determine which real server may be provided as the answer to a DNS query. Examples of regions include Americas, Europe, Asia, and so on but are not limited to these. If regionA, regionB, regionC, regionD represent various regions, a routing plan for a region regionA may be an ordered list of regions such as regionA→regionC→regionB→regionD, and a routing plan for a regionC may be regionC→regionD→regionA→regionB.

According to an embodiment, the system stores a routing plan to determine an alternate region in case on non-availability of servers in a region. The routing plan identifies a sequence of regions in order of priority. The system traverses the sequence of regions specified in the order of the routing plan to identify a region. For example, assume that the routing plan specifies a sequence regionA→regionB→regionC→regionD. If there are no servers available in regionA, the system searches for an applicable server in regionB; if there are no servers available in regionB, the system searches for an applicable server in regionC; If there are no servers available in regionC, the system searches for an applicable server in regionD and so on. The system identifies servers from the region identified based on the routing plan. If no servers can be identified based on the routing plan, the system may return any healthy server.

If there are multiple servers or sets of servers, the system selects 450 a server or a set of servers based on weights as well as previous servers that were returned in response to DNS queries received for this particular virtual server. Accordingly, the system returns real servers that are remaining such that in a given time interval, the number of times a set of server (or a server) is returned is proportionate to the weight of the set of servers (or the weight of the set associated with the server). For example, if the weight of a set S1 of servers is w1 and the weight of the set S2 of servers is w2, and w1 is greater than w2, then the set S1 (or servers from set S1) have higher likelihood of being returned in response to a DNS query for the virtual server than the set S2. Furthermore, the system ensures that the ratio of the probability p1 of returning set S1 compared to the probability p2 of returning set S2 matches the ratio of weights w1 and w2. The system stores 455 the server that is selected and returns the server in response to the query. The system stores information indicating the number of times a server or a set of servers was returned in response to a DNS query identifying a virtual server so that the historical information can be used to determine the response to the DNS query when it is received again.

Figure 5A:
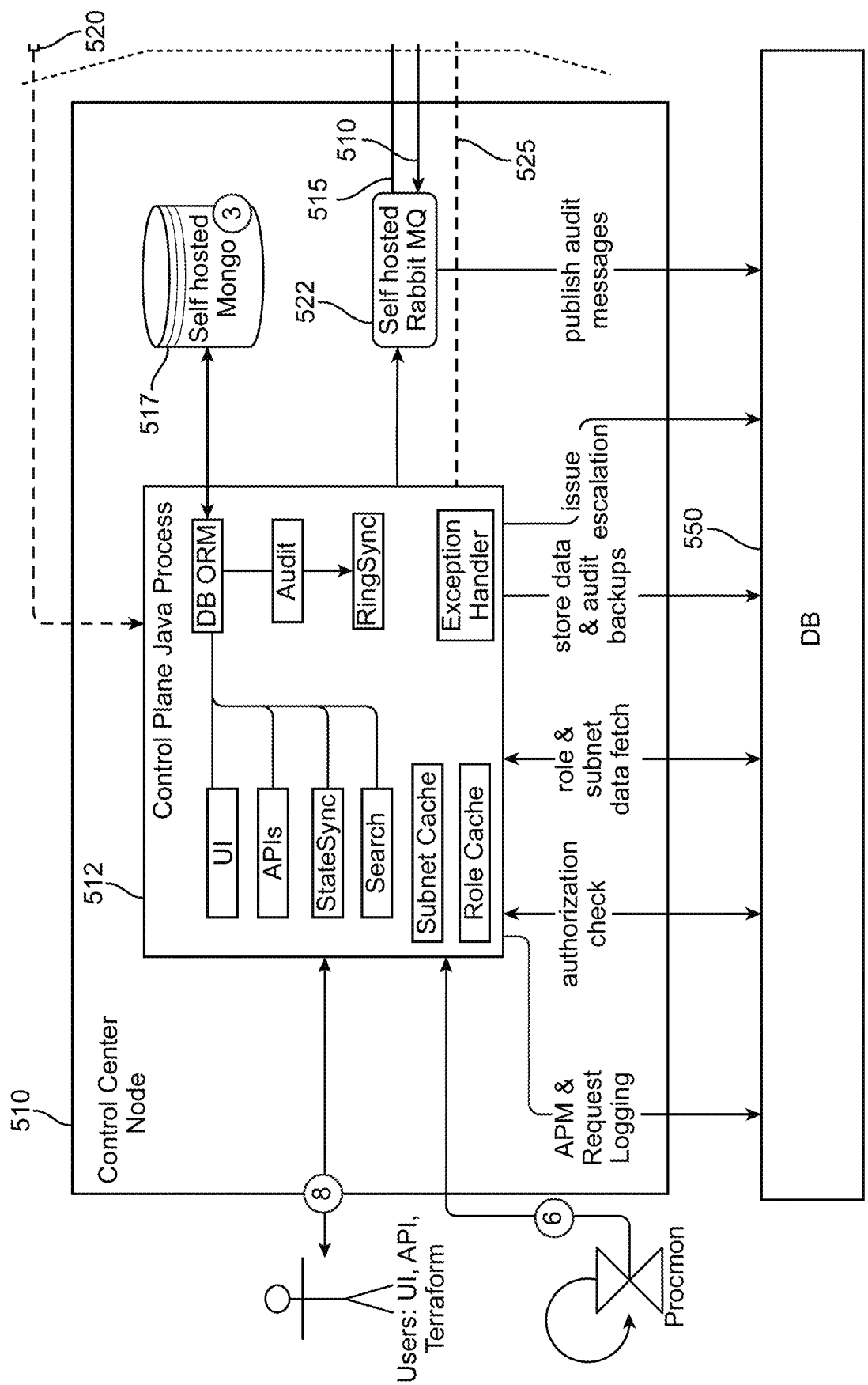
FIGS. 5A-B illustrate the system architecture of the control plane and data plane and their interactions according to an embodiment.
Figure 5B:
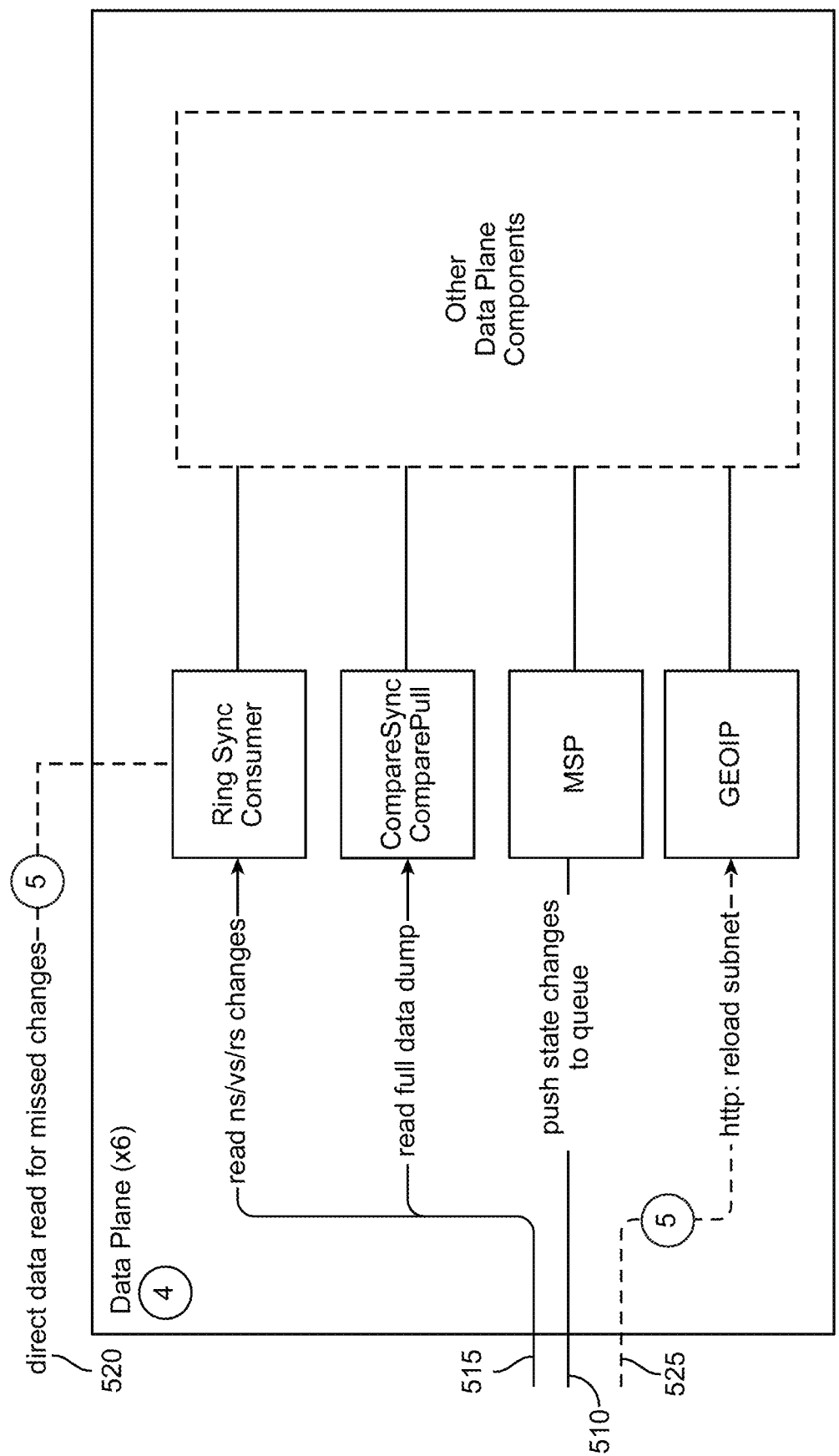

FIGS. 5A-B illustrate the system architecture of the control plane and data plane and their interactions according to an embodiment. A user can use the system to efficiently (in few seconds) create aliases (virtual servers) for backends running services (real or physical servers) and load balance traffic to them by region, health, weight, or any combination of these. There can be multiple data plane clusters that operate independent of each other. So if one of the data plane cluster is not operating or is not reachable, the other data plane clusters may be used. As a result, a data plane can be upgraded independent of other data planes. For example, during upgrade of one data plane clusters the remaining data plane clusters can provide the required service. The control plane cluster supports a high rate of requests, for example, several thousand requests per minute. Similarly, the system can perform health checks at a very high rate, e.g., several thousand health checks per second.

The control center node 510 executes a control center process 512 that receives requests via a user interface or API. Data describing the requests may be stored in a database 517, for example, a document database such as MongoDB™. If there is a change request received via the control plane, transactions of the database are used to reliable execute the changes and feed them to the data plane. The control plane stores information such as logs, audit information, and so on in DB 550. The control plane mode interacts 515 with the data plane via a queue 522. If the system needs to write information based on a change request received via an API, the system writes the changes to the data as well as audit information for the change in a transaction of the database 517. Auditing the changes allows enforcing security for changes to the system by allowing an expert to review changes that have occurred and the users that performed the changes. Examples of change events processed include creating a new virtual server alias, deleting a virtual server alias, updating weights of a server, changing the virtual server alias definition, and so on. According to an embodiment, the database 517 supports change streams such that a process can subscribe to changes of the change stream. As a result, every time there is a change, the change is pushed down to the queue 522. The change is consumed by any of the data plane clusters.

The control plane node performs various tasks such as logging of requests, authorization check, audit backups and so on. Control plane nodes are stateless and can be scaled horizontally. The data plane clusters can continue to run even if the control plane nodes stop functioning.

The data plane is responsible for various functions. The data plane nodes provide, via the DNS protocols, records to clients. The data plane nodes calculate the answer provided back to the client based on a number of different factors such as the clients' location, the records configuration including weights and health checks. The data plane performs health checks against target backends. The data plane provides a mechanism to sync up data from the control plane. The data plane provides a mechanism to provide health check status changes back to the control plane.

Changes received by a data plane are processed by a data synchronization service that propagates the changes to a data store of the data plane or a site within the data store. Even though the same change is propagated to multiple data planes, two different data planes may respond to the same DNS query in different manner. For example, a first data plane cluster may return a server S1 in response to a DNS query specifying a virtual host V1, whereas a second data plane cluster may return a server S2 in response to the same DNS query specifying a virtual host V1. This may be due to various reasons, for example, because the different data planes may determine different values for the health of the servers, the data may be stored in the cache of each data plane for different length of time, and so on. The data plane node also considers factors such as the location of the client to determine the right result for a DNS query received from the client.

The system associates each change event with serial ID to ensure that no change events are lost. The serial IDs are monotonically increasing. A node in a data plane cluster includes a cache that stores the information of the data store of the data plane. The data plane receives and processes a client request. The data plane node determines the right real server for a virtual server alias.

Figure 6:
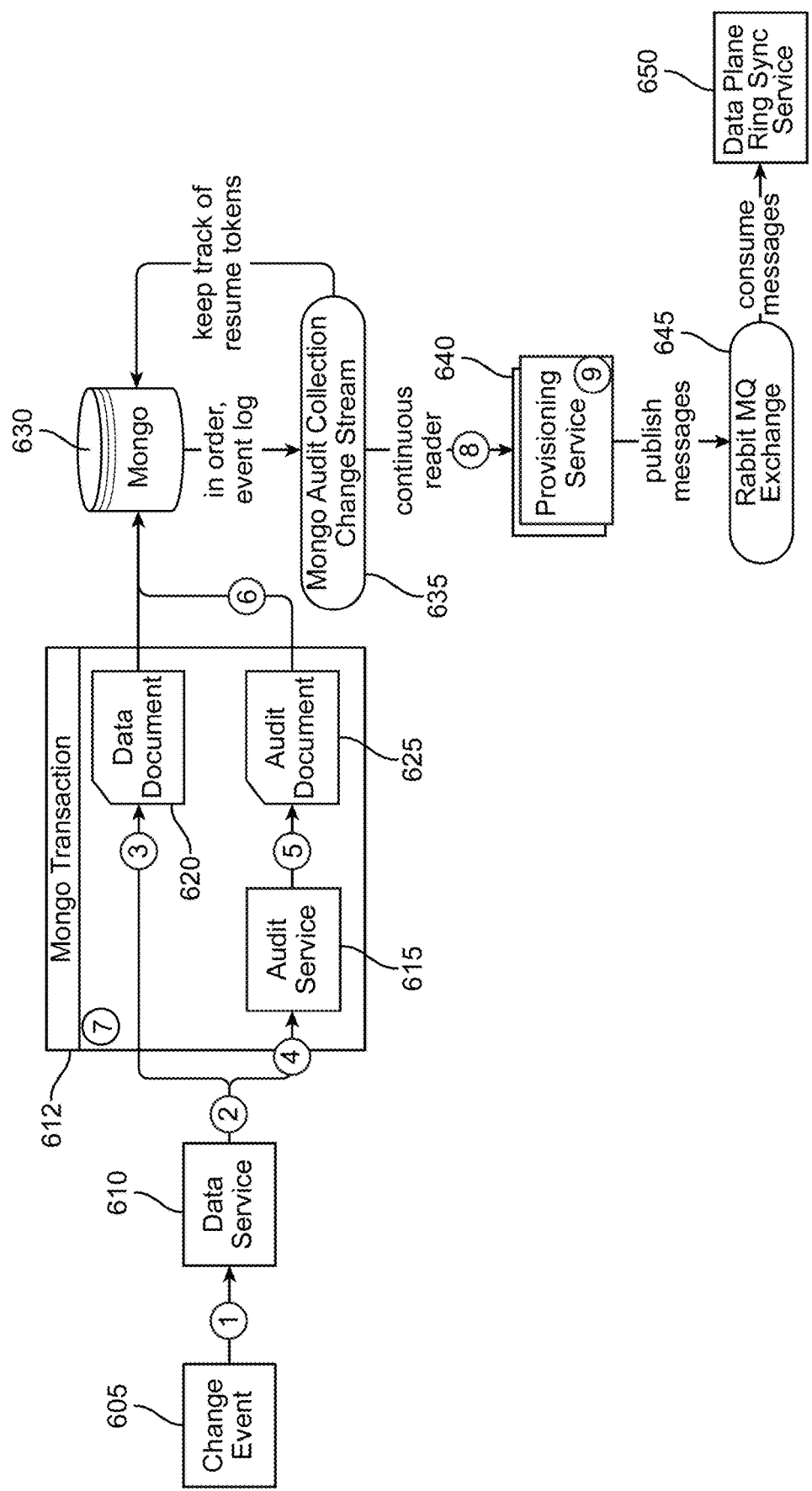
FIG. 6 shows the processing of change events using database transactions according to an embodiment.

FIG. 6 shows the processing of change events using database transactions according to an embodiment. The database is a document database that stores documents as collections. Change events 605 that are received are processed using the appropriate service 610 to effect the changes. The service 610 creates a database transaction 612. The change event is saved as a document 620 into an appropriate collection of the database. The data for the change event is passed to an audit service 615. The audit service creates an audit document 625. The audit document 625 has temporal data and is immutable. The system uses the database 630 to generate a monotonically increasing timestamp. A serial ID for each transaction is also generated. Some serial IDs may have to be discarded (in the event of rollbacks). However, the system does not keep track of discarded serial IDs (to avoid a situation where the data plane attempts to read an uncommitted serial ID). The system uses a wait timeout longer than the auto-rollback timeout from the database. The system determined that any unfound serial IDs are a result of a rollback.

The database 630 includes an audit collection. The system persists the audit document (within the same transaction as above) into the audit collection. Any kind of failure inside the transaction boundary results in no changes to the database as failures rollback properly (or via timeout). There may be multiple threads/processes that read the change stream 635 for high availability. These publish the same message into the queue 645 (e.g., RabbitMQ). The consumer's (data plane) manages the duplicate messages.

A provisioning service 640 listens to changes to the audit collection via the database change stream. A single audit message may result in multiple messages (or vice versa) passed into the queue exchanges.

Figure 7:
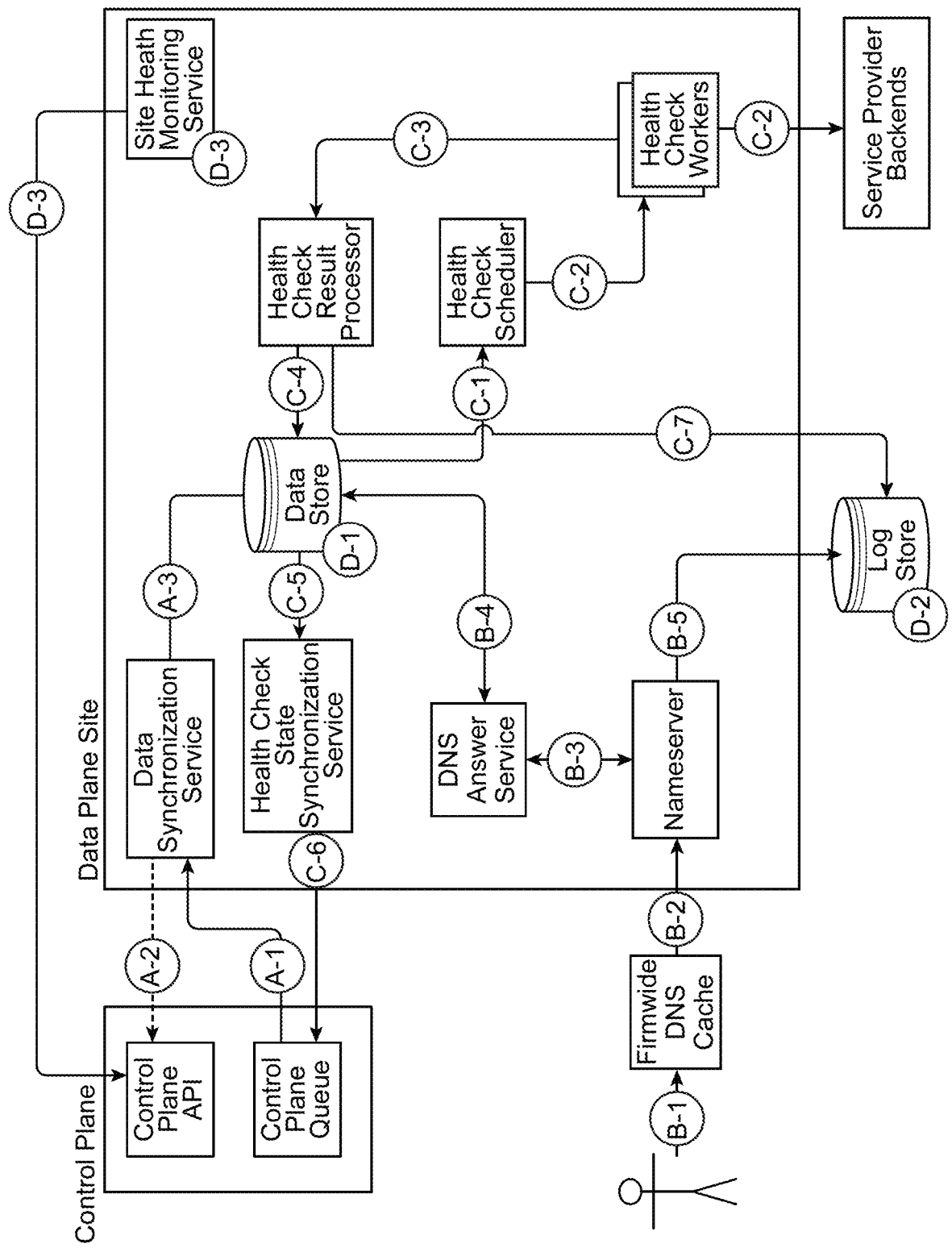
FIG. 7 shows the interactions of various components of the data plane and control plane according to an embodiment.

FIG. 7 shows the interactions of various components of the data plane and control plane according to an embodiment. The interaction A-1 shows that as changes come through the control plane, they are submitted into a queue (as an event log). These changes are picked up and processed in order (by a serial ID). A serial ID miss in one virtual server does not impact other virtual servers. Skipping serials IDs is supported. The interaction A-2 shows that in case an out of order update is received (or the queue mechanism breaks), the APIs are used as fallback mechanism to fetch serial IDs over HTTP. The interaction A-2 shows that data is persisted into database as full flattened records. Consistency is preferred on this write so a slower write is OK (e.g., 1000 writes per second)

The data synchronization service supports both incremental (event log) updates as wen as full data sync. The full data sync serves as a backup mechanism to ensure that data is correct on both sides. Full data sync is performed periodically. The service also syncs up subnet information required for regional routing. Interaction B-1 represents that clients resolve DNS queries via a caching infrastructure. Interaction B-2 represents that queries are forwarded to the nameserver. This component is responsible for DNS protocol translation. Once decoded, requests are sent to the DNS Answer Service. Interaction B-3 represents that DNS Answer service receives decoded structured requests. It asks the database (possibly via a cache) for the data attached to the requested record. It performs any computation logic required (health, region, weight, etc.) and returns the final structured answer to the nameserver to DNS protocol translation into the response. Interaction B-4 represents that data is looked up by indexed searches on the data store. The data store must perform well at scale and be read optimized. Data model needs to be light weight and simple enough for fast data retrieval. Interaction B-5 represents that every query received by the name server is logged. Ideally, log aggregation for certain metrics should take place for long term storage. Full request-responses may have shorter life spans.

The data store D-1 is the central component of the system. The data store is fast at reads as the workload is a heavy-read profile. No data is stored or backed up because data is mastered and managed via the control plane. The data store contains subnet data as well as metadata for the site.

The log store D-2 is used to store a large volume of data. The log store D-2 is write-optimized and has policies for automatic data removal due to the volume of DNS and health checking logs. The log store is shared by all data planes.

The site health monitoring service D-3 is responsible to ensure that all components of the site are performing optimally. If the components are not performing optimally, the site health monitoring service D-3 is responsible for alerting as well as turning off the site to protect the overall data plane from misbehaving sites.

The site health monitoring service D-3 also reports to the control plane and co-ordinates (via the control plane) to ensure that at-least one site is up before turning off sites when there are failures of components. The site health monitoring service D-3 also serves as a web server for site administrative functions.

On a periodic basis (every second), the health check scheduler service attempts to discover C-1 all target endpoints that require to be checked and attempt to schedule the work. The scheduler is multi-instance and distributed for reliability.

The workers are simple execution engines to perform C-2 the check directly against the target backends. Workers (all together within the site) process at a minimum of $15k$ checks per second. Once work is done, results are reported C-3 to a result processor.

The processor stores C-4 final state against records for simple lookups as well state change information. A change trigger is used to push C-5 out health audit events into the state synchronization service. The messages are translated C-6 and provided back into the control plane via the state Change queue. The system supports a full (and current) state sync for all records. All work is reported C-7 into the log store for query and analysis.

FIG. 8 shows the overall flow of the server health checking system according to an embodiment. The health checking system is composed of 2 parts: (1) a master scheduler process (MSP) responsible for managing and scheduling health checks and managing results, and (2) a worker manager, responsible for starting and managing health checking workers which perform the tasks of the checking health of servers. A task may also be referred to herein as a job.

The system is highly scalable and is able to perform a very large number of health check operations, for example, with the state-of-the-art processing hardware, the system was able to process roughly 30,000 checks/per second across the cluster at half capacity in terms of CPU cores. The master scheduler process is composed of the following 4 components: (1) a service engine 802, responsible for managing inter-process communication, resiliency and failover; (2) a multiplexer 810 (or work multiplexer), responsible for distributing jobs to workers and managing response from workers; (3) a writer 830, responsible for propagating responses to the database, nameservers and into the control plane; and (4) a scheduler 805, responsible of scheduling of jobs. Each component may be implemented as a process, for example, a daemon process. Each component is configurable and reads a set of configuration parameters to start processing.

The service engine 802 process check heartbeats of all the main components, e.g., multiplexer 810, writer 830, scheduler 805 and may turn them on/off based on health of the system. For example, if the service engine 802 determines that a component, for example, scheduler 805 is down, the service engine attempts to restart the scheduler 805. If the service engine 802 determines that a component such as the scheduler 805 is unable to restart, the service engine 802 may take the entire data plane cluster offline since the data plane cluster is unable to monitor the health of the servers and is therefore not able to process DNS queries accurately. As a result, the DNS queries are redirected to another data plane cluster. However, if the system performs a site health check and determines that this data plane cluster is the only functioning data plane cluster, the system keeps the data plane cluster running so that the system is able to process DNS queries, even if the results are not accurate, instead of shutting down the entire system.

Figure 9:
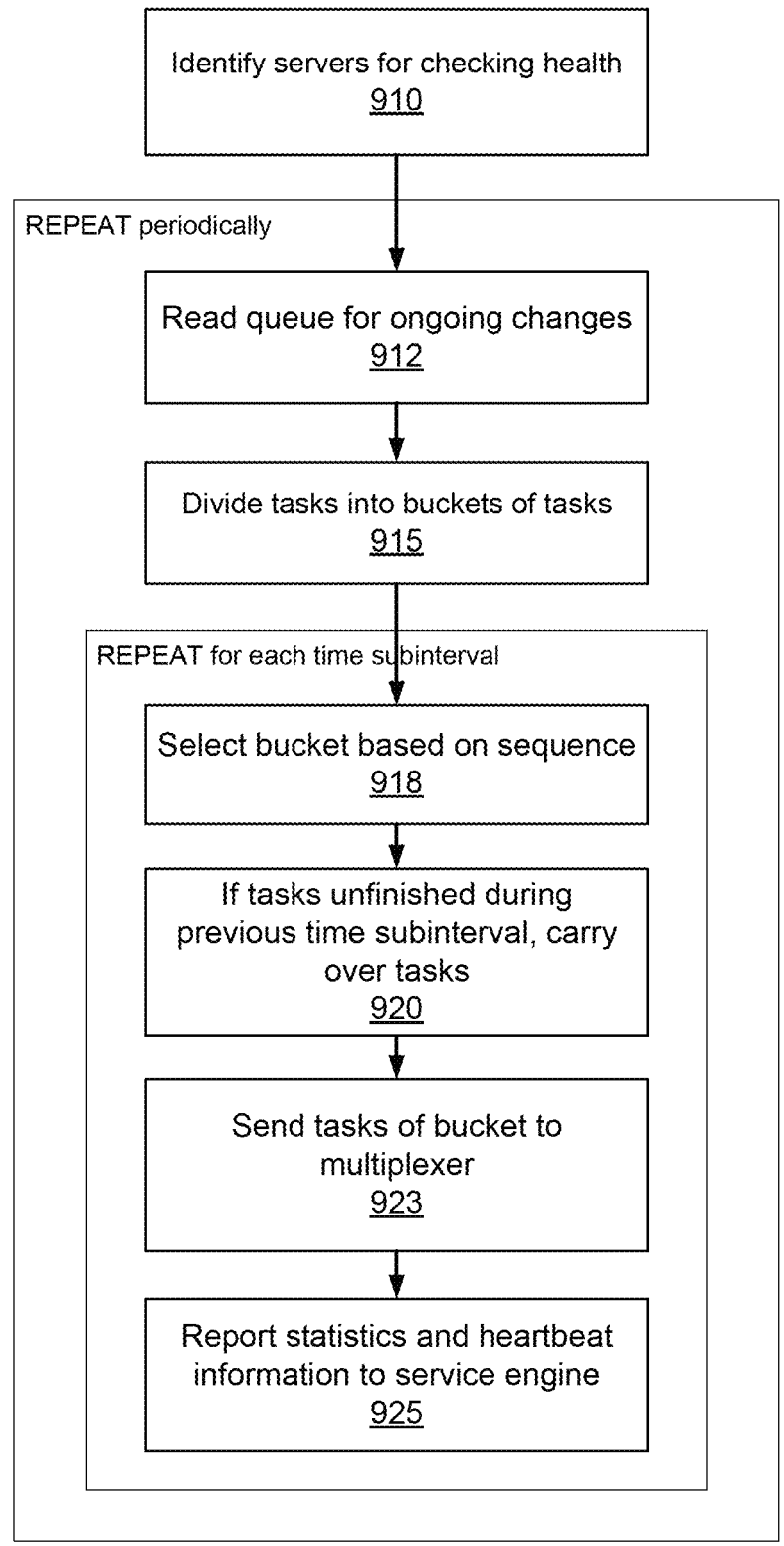
FIG. 9 shows a flowchart illustrating the scheduler process according to an embodiment.

FIG. 9 shows a flowchart illustrating the scheduler process according to an embodiment. The scheduler 805 identifies 910 the various servers for checking their health. The scheduler 805 opens connection to the queue to monitor for ongoing changes, opens connection to the database to read all records from database into memory. The scheduler 805 reads all initial health check state data from the database into memory and also any DNS namespace information. The scheduler 805 opens a connection to the multiplexer 810, for example, a TCP socket connection. The records loaded by the scheduler 805 store information describing the various servers including their mapping to virtual servers and the current known health information of the server indicating whether the server is up or down.

The scheduler 805 performs the following steps repeatedly. The scheduler 805 reads 912 the queue for ongoing changes to records and ensuring records in database match the in-memory copy of records. The scheduler 805 may filter down records, for example, by checking metadata for the record to determine whether health check is disabled for any record.

The scheduler 805 creates a plurality of server health check tasks. Each server health check task is configured to determine a measure of server health of a server with respect to a location, for example, a data plane cluster or a building within the data plane cluster. Each measure of server health associated with a communication protocol for reaching the server from a computing device in a particular location. Examples of communication protocol that may be associated with a worker include tcp (transmission control protocol), http (hypertext transfer protocol), or https (hypertext transfer protocol secure), or icmp (internet control message protocol). A worker uses a corresponding communication protocol to reach a server. If the worker is able to reach the server within a threshold time, the worker determines that the health of the server is up or else the worker determines that the health of the server is down.

The scheduler divides 915 the plurality of server health check tasks into a sequence of buckets of tasks. Accordingly, the tasks are divided into a plurality of buckets of tasks and each bucket is assigned a sequence number indicating the order in which the bucket of tasks is processed within a time interval.

The system monitors health of the plurality of servers by repeating following periodically, for example, all buckets are processed in a time interval (e.g., 10 seconds) and then the process repeated in the next time interval. The system processes the plurality of server health check tasks within the time interval. The scheduler divides the time interval into a plurality of time subintervals, one time subinterval corresponding to each bucket. For example, if there are 10 buckets and the time interval is 10 seconds long, each second of the 10 seconds is assigned to a bucket. The plurality of buckets of tasks are processed in order of the sequence of the buckets of tasks, each bucket of tasks processed during a time subinterval assigned to the bucket.

Accordingly, the scheduler repeats the steps 918, 920, 923, 925 for each time subinterval. The system selects 918 the bucket corresponding to the time subinterval based on the sequence number of the bucket. If the scheduler determines 920 that there were tasks that were unfinished in the previous time subinterval, the scheduler adds the unfinished tasks to the current bucket so that the unfinished tasks are carried over. The scheduler sends 923 the server health check tasks of the bucket of tasks to worker processes. Each worker process determines a measure of server health of a server by communicating with the server using a communication protocol of the worker process. The scheduler determines statistics, for example, number of unfinished tasks that were carried over, number of workers that were functioning, and so on and sends 925 the statistics for display via a user interface of the control plane. The scheduler also sends a heartbeat signal to the service engine indicating the health of the scheduler itself.

Figure 10:
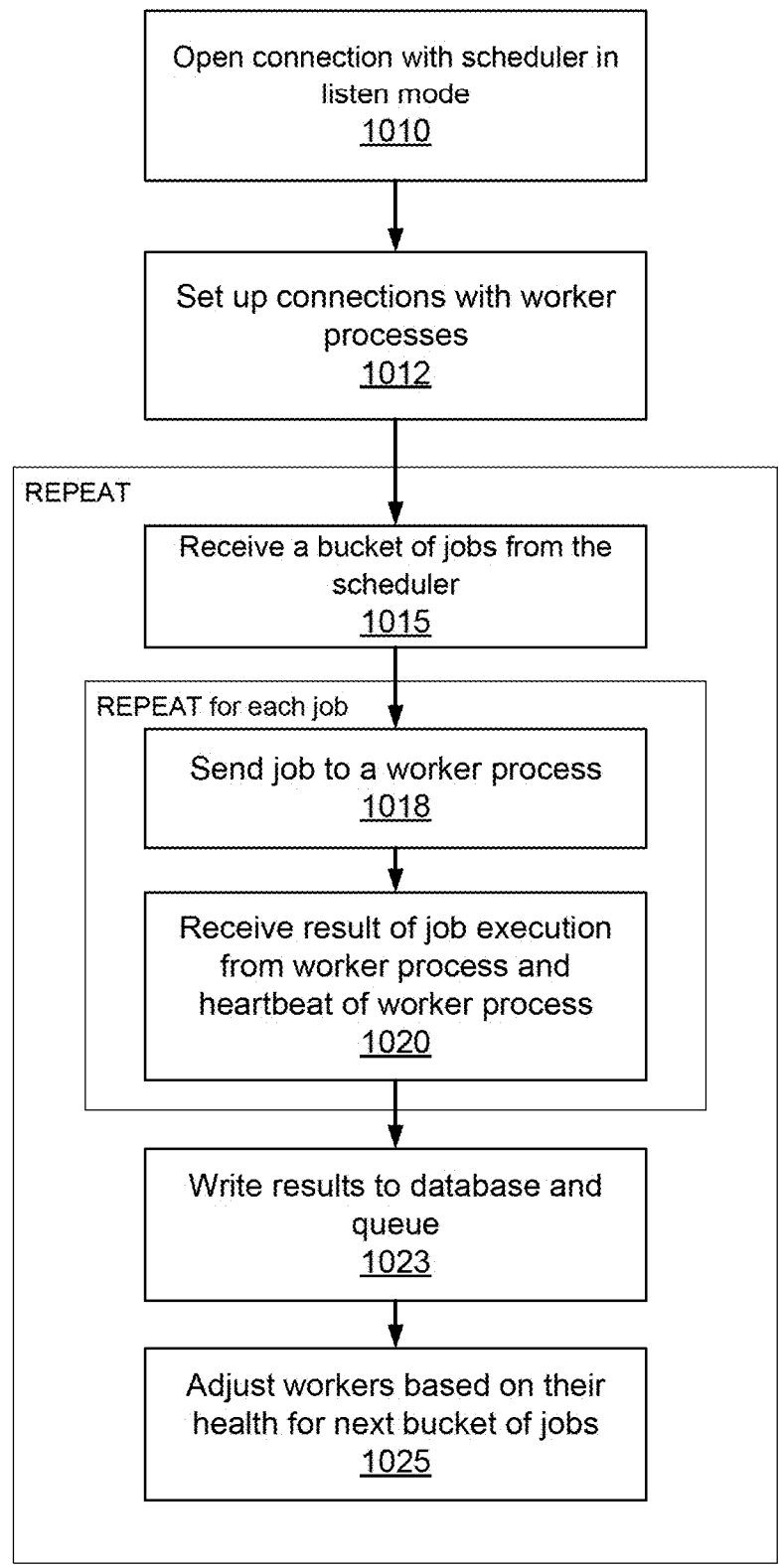
FIG. 10 shows a flowchart illustrating the multiplexer process according to an embodiment.

FIG. 10 shows a flowchart illustrating the multiplexer process according to an embodiment. The multiplexer process receives jobs from the scheduler and ensures that the jobs are processed by worker processes. The multiplexer process opens 1010 a connection (e.g., a TCP socket) with the scheduler. The multiplexer process opens 1012 connections (e.g., TCP sockets) with the worker processes. The multiplexer process repeats the steps 1015, 1018, 1020, 1023, 1025 periodically. The multiplexer process receives 1015 a set of jobs from the scheduler, for example, a bucket of jobs. The multiplexer process sends 1018 the jobs to the worker processes. The multiplexer process receives 1020 results of execution of the jobs from the worker processes indicating the health of a server. The multiplexer process also receives a heartbeat signal from the worker processes indicating the health of the worker process. The multiplexer process writes 1023 the results of the jobs to a writer process that stores the information in a database and also propagates the information to various data planes via the queue. The multiplexer process 1025 adjusts the worker processes that are assigned jobs for the next time based on the status (health or heartbeat signals) of worker processes received.

The writer process opens connections to the queue and the database. The writer process also opens a connection to the multiplexer to listen to information provided by the multiplexer process. The writer process reads results of server health checks from the multiplexer and determines whether the state of health of any server changed, i.e., changed from up to down or from down to up. The writer process writes to the database and queue describing the state change information for the servers that changed state. The writer process also provided statistics to the control plane, for example, number of servers that changed state. The writer process also sends a heartbeat to the service engine describing the health of the writer process.

A worker manager process starts worker processes. Each worker process opens a connection to the multiplexer process so as to listen to the multiplexer process for tasks that the worker should execute as well as to provide the multiplexer with results of server health check. The worker process receives information identifying a server for performing health check and performs health check by attempting to connect to the server using a communication protocol associated with the worker. The worker process may receive from the server an indication that the communication was successful or an indication that the communication failed. The indication of failure may be a time out or an error message received as a result of the communication protocol. The worker process writes the result to the multiplexer process. The worker process also sends a heartbeat signal indicating the health of the worker process itself to the multiplexer process.

The results of the health checks are provided by the multiplexer process to the writer process that provides the results to the database and the queue. The health check information is propagated to each data pane cluster from the database and the queue. The data plane clusters store the health check information in the DNS cache and use the information for providing up to date results in response to DNS queries.

Screenshots of user interfaces displayed via a control plane are illustrated in FIGS. 11A-G described as follows.

FIG. 11A illustrates aspects of a user interface for an administration health check view, according to one embodiment. The user interface allows the user, for example, a system administrator to request health check. A user interface 1105 shows various types of health check. A user interface 1108 displays statistics describing the health check information.

FIG. 11B illustrates aspects of a home page of a user interface, according to one embodiment. The user interface allows users to perform various types of operations including creating 1112 a namespace, creating 1114 a virtual server, and updating 1118 weights of a set of real servers.

Figure 11C:
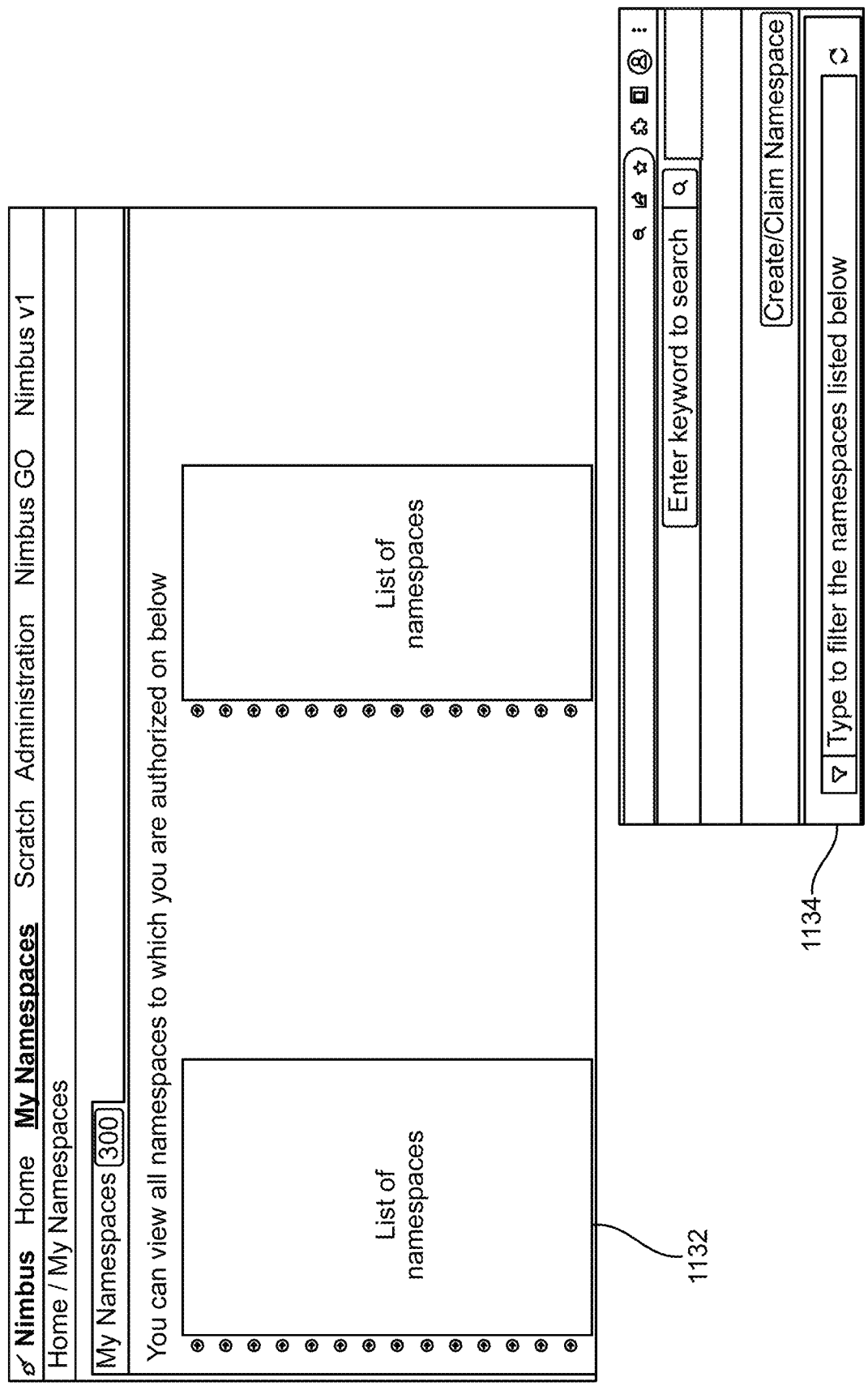
FIG. 11C illustrates aspects of a user interface for a namespace view, according to one embodiment.

FIG. 11C illustrates aspects of a user interface for a namespace view, according to one embodiment. The user interface shows a list 1132 of all namespaces. A user can filter 1134 namespaces using search criteria.

Figure 11D:
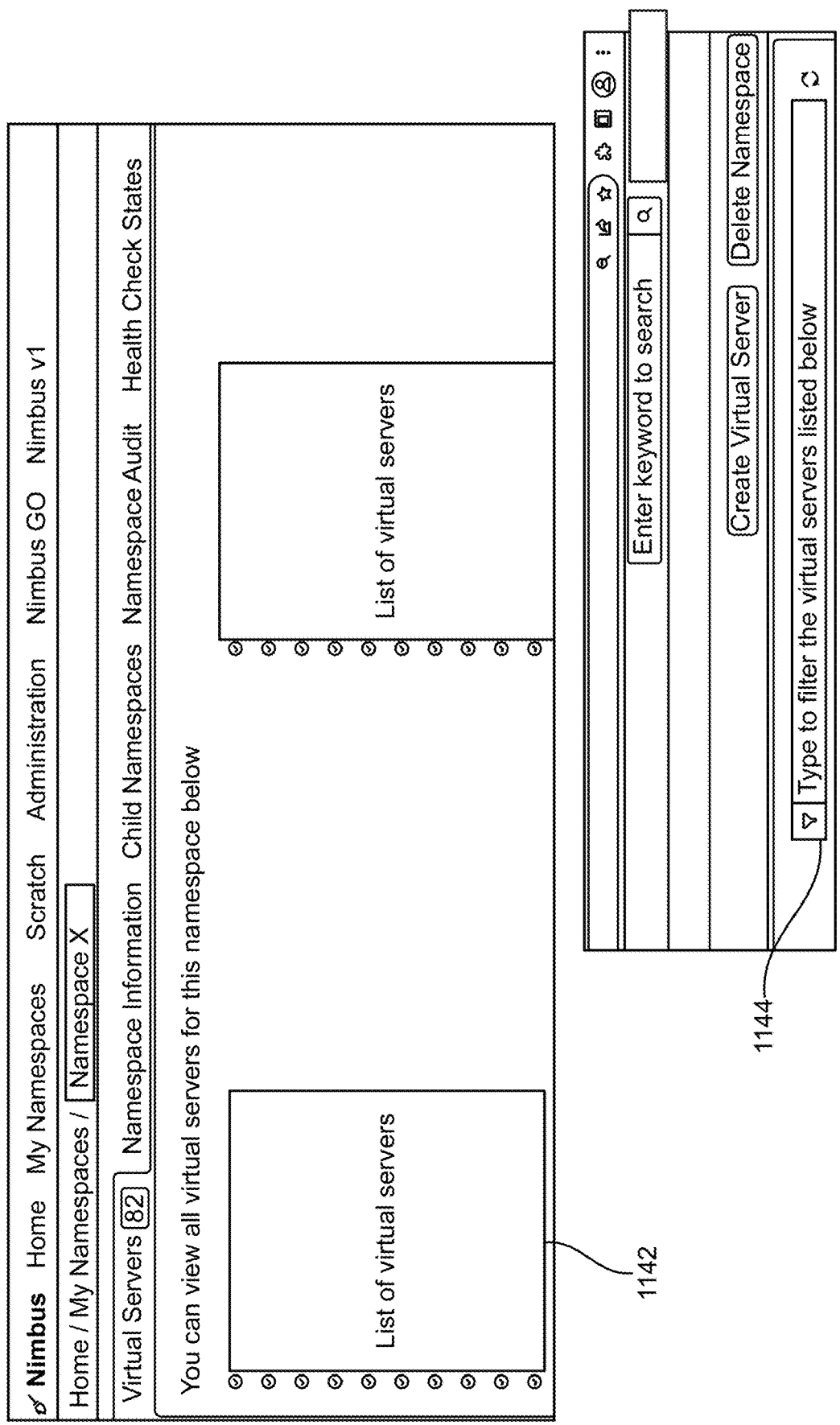
FIG. 11D illustrates aspects of a user interface for a virtual server view, according to one embodiment.

FIG. 11D illustrates aspects of a user interface for a virtual server view, according to one embodiment. The user interface shows a list 1142 of all virtual servers. A user can filter 1144 virtual servers using search criteria.

FIG. 11E illustrates aspects of a user interface for a virtual server audit view, according to one embodiment. The audit view shows various action 1152 and the users 1154 that performed the actions.

Figure 11F:
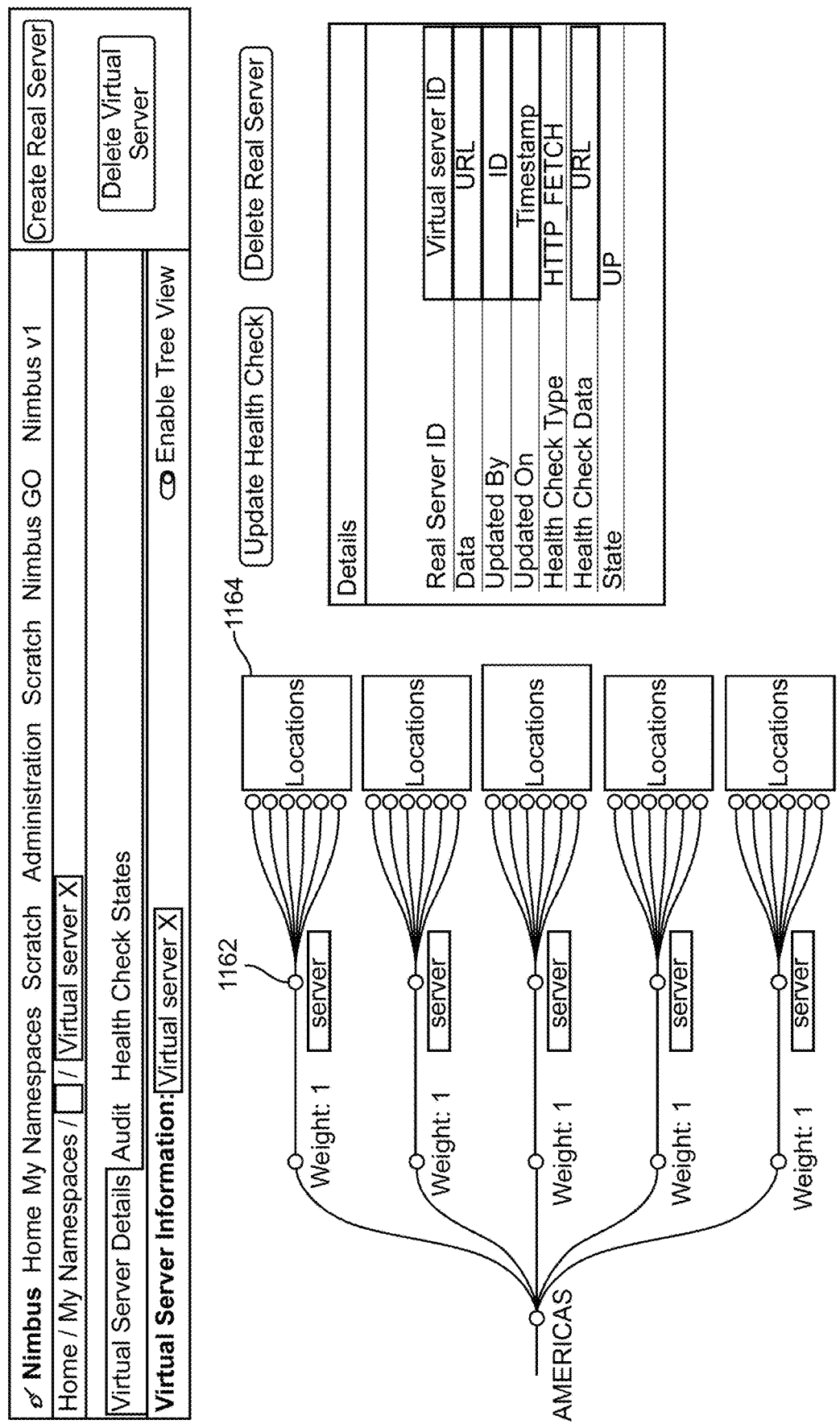
FIG. 11F illustrates aspects of a user interface for a virtual server details view, according to one embodiment.

FIG. 11F illustrates aspects of a user interface for a virtual server details view, according to one embodiment. The user interface shows the mapping of a virtual server to different real servers 1162 and the weights of the real servers from different locations 1164 corresponding to different data plane clusters.

FIG. 11G illustrates aspects of a user interface for a virtual server health check state view, according to one embodiment. The user interface shows the various real servers and their health 1172 as well as different types of metadata including timestamp when the health was checked, corresponding virtual server, and so on.

Computing System Architecture

Figure 12:
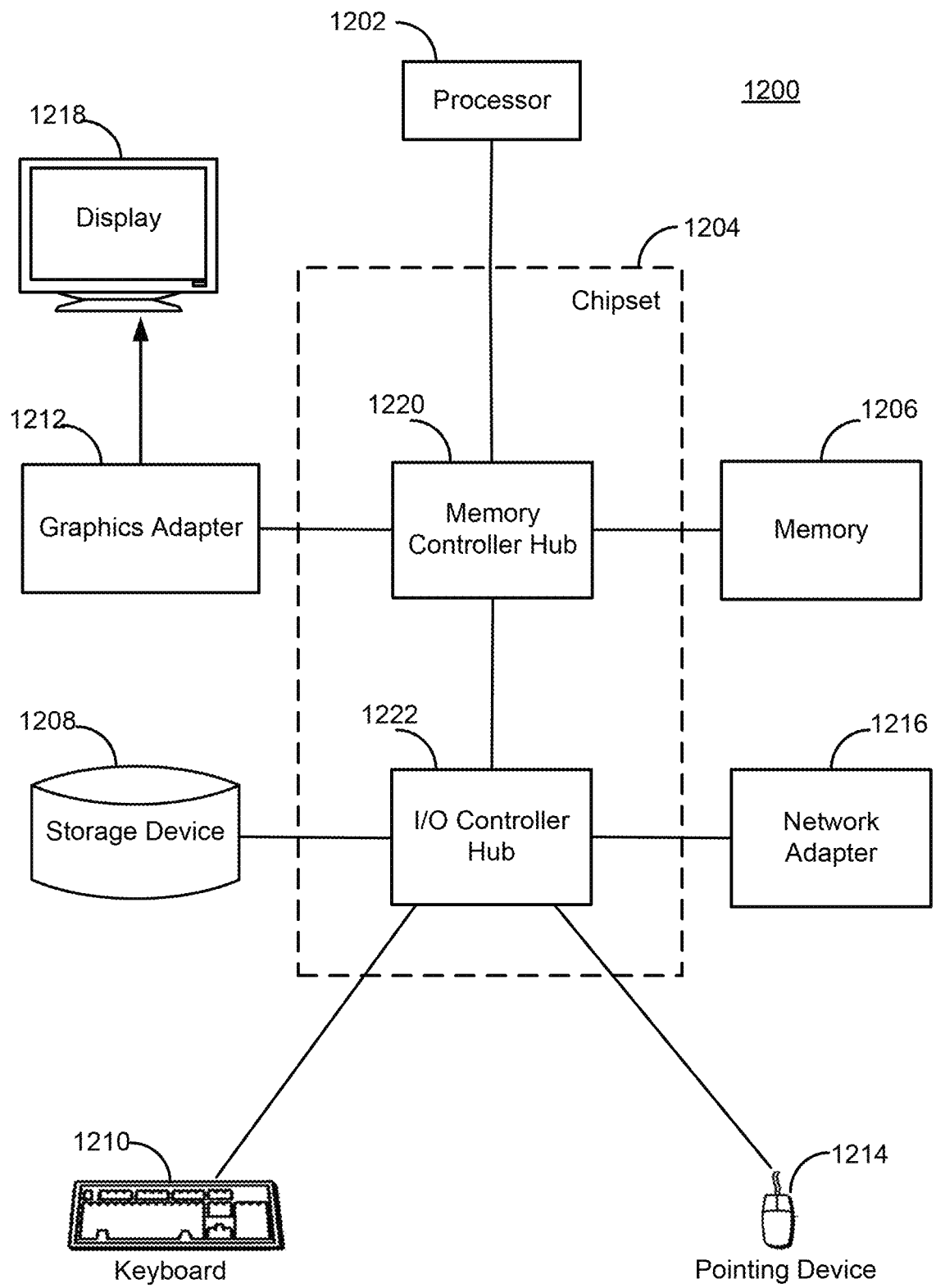
FIG. 12 is a block diagram of an example computer suitable for use as a server or client device.

FIG. 12 is a block diagram of an example computer 1200 suitable for use as a server or client device. The example computer 1200 includes at least one processor 1202 coupled to a chipset 1204. The chipset 1204 includes a memory controller hub 1220 and an input/output (I/O) controller hub 1222. A memory 1206 and a graphics adapter 1212 are coupled to the memory controller hub 1220, and a display 1218 is coupled to the graphics adapter 1212. A storage device 1208, keyboard 1210, pointing device 1214, and network adapter 1216 are coupled to the I/O controller hub 1222. Other embodiments of the computer 1200 have different architectures.

In the embodiment shown in FIG. 12, the storage device 1208 is a non-transitory computer-readable storage medium such as a hard drive, compact disk read-only memory (CD-ROM), DVD, or a solid-state memory device. The memory 1206 holds instructions and data used by the processor 1202. The pointing device 1214 is a mouse, track ball, touch-screen, or other type of pointing device, and may be used in combination with the keyboard 1210 (which may be an on-screen keyboard) to input data into the computer system 1200. The graphics adapter 1212 displays images and other information on the display 1218. The network adapter 1216 couples the computer system 1200 to one or more computer networks, such as network 170.

The types of computers used by the entities of FIGS. 1 and 2 can vary depending upon the embodiment and the processing power required by the entity. For example, the computers can lack some of the components described above, such as keyboards 1210, graphics adapters 1212, and displays 1218.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs. Thus, while particular embodiments and applications have been illustrated and described, it is to be understood that the described subject matter is not limited to the precise construction and components disclosed. The scope of protection should be limited only by the following claims.

What is claimed is:

1. A method for domain name system (DNS) based global server load balancing, the method comprising:
    identifying a plurality of servers, each server associated with a virtual server;
    creating a plurality of server health check tasks, each server health check task for determining a measure of server health of a server with respect to a location, wherein the measure of server health is associated with a communication protocol for reaching the server from a computing device in the location;
    dividing the plurality of server health check tasks into a sequence of a plurality of buckets of tasks;
    monitoring health of the plurality of servers by repeating periodically, processing the plurality of server health check tasks within a time interval, the time interval comprising a plurality of time subintervals, the plurality of buckets of tasks processed in order of the sequence of the plurality of buckets of tasks, each bucket of tasks processed during a time subinterval assigned to the bucket, the processing comprising:
        sending each server health check task to a worker process associated with the communication protocol, wherein the worker process determines the measure of server health of the server by communicating with the server using the communication protocol of the worker process,
        receiving results of the plurality of server health check tasks from the worker processes, and
        propagating the received results of the plurality of server health check tasks to a plurality of data plane clusters; and
    processing DNS queries requesting one or more servers for processing requests directed to a virtual server, the processing comprising selecting the one or more servers based on the received results of the plurality of server health check tasks.

2. The method of claim 1, wherein processing of the bucket of tasks further comprises:
    determining that one or more tasks of the bucket of tasks were unfinished at end of the time subinterval corresponding to the bucket of tasks; and
    adding the one or more tasks of the bucket of tasks to the bucket that is next in the sequence of buckets of tasks.

3. The method of claim 1, further comprising:
    receiving a request associated with the virtual server identified by a uniform resource locator (URL), wherein the processed requests to the virtual server are processed by the one or more servers from the plurality of servers; and
    updating information stored in a database based on the request, wherein the database comprises records mapping virtual servers to the plurality of servers.

4. The method of claim 1, wherein processing a DNS query received from a client device comprises:
    identifying, based on information stored in a DNS cache, one or more candidate servers for the virtual server;
    selecting, a particular server from the one or more candidate servers based on factors comprising a measure of the server health of the selected particular server, and a location associated with the client device; and
    providing a response identifying the particular server selected from the one or more candidate servers to the client device.

5. The method of claim 1, wherein the communication protocol associated with the measure of the server health of the server is one of tcp (transmission control protocol), http (hypertext transfer protocol), or https (hypertext transfer protocol secure), or icmp (internet control message protocol).

6. The method of claim 1, wherein propagating the received results of the plurality of server health check tasks to the plurality of data plane clusters comprises:
    writing the received results of the plurality of server health check tasks to a queue, wherein each of the plurality of data plane clusters listens to changes written to the queue to update data stored in a DNS cache.

7. The method of claim 1, wherein the received results of the server health check tasks of the one or more selected servers indicate whether each of the one or more selected servers is up or down.

8. A non-transitory computer-readable storage medium storing instructions that when executed by one or more computer processors, cause the one or more computer processors to perform steps comprising:
    identifying a plurality of servers, each server associated with a virtual server;
    creating a plurality of server health check tasks, each server health check task for determining a measure of server health of a server with respect to a location, wherein the measure of server health is associated with a communication protocol for reaching the server from a computing device in the location;
    dividing the plurality of server health check tasks into a sequence of a plurality of buckets of tasks;
    monitoring health of the plurality of servers by repeating periodically, processing the plurality of server health check tasks within a time interval, the time interval comprising a plurality of time subintervals, the plurality of buckets of tasks processed in order of the sequence of the plurality of buckets of tasks, each bucket of tasks processed during a time subinterval assigned to the bucket, the processing comprising:
        sending each server health check task to a worker process associated with the communication protocol, wherein the worker process determines the measure of server health of a server by communicating with the server using the communication protocol of the worker process,
        receiving results of the plurality of server health check tasks from the worker processes, and
        propagating the received results of the plurality of server health check tasks to a plurality of data plane clusters; and
    processing DNS queries requesting one or more servers for processing requests directed to a virtual server, the processing comprising selecting the one or more servers based on the received results of the plurality of server health check tasks.

9. The non-transitory computer-readable storage medium of claim 8, wherein the bucket is associated with a time subinterval, wherein instructions for processing of the bucket further cause the one or more computer processors to performs steps comprising:
    determining that one or more tasks of the bucket of tasks were unfinished at end of the time subinterval corresponding to the bucket of tasks; and
    adding the one or more tasks of the bucket of tasks to the bucket that is next in the sequence of buckets of tasks.

10. The non-transitory computer-readable storage medium of claim 8, wherein the instructions further cause the one or more computer processors to performs steps comprising:

receiving a request associated with the virtual server identified by a uniform resource locator (URL), wherein the processed requests to the virtual server are processed by the one or more servers from the plurality of servers; and updating information stored in a database based on the request, wherein the database comprises records mapping virtual servers to servers.

11. The non-transitory computer-readable storage medium of claim 8, wherein instructions for processing a DNS query received from a client device further cause the one or more computer processors to performs steps comprising:

identifying, based on information stored in a DNS cache, one or more candidate servers for the virtual server;

selecting, a particular server from the one or more candidate servers based on factors comprising a measure of the server health of the selected particular server, and a location associated with the client device; and providing a response identifying the particular server selected from the one or more candidate servers to the client device.

12. The non-transitory computer-readable storage medium of claim 8, wherein the communication protocol associated with the measure of the server health of the server is one of tcp (transmission control protocol), http (hypertext transfer protocol), or https (hypertext transfer protocol secure), or icmp (internet control message protocol).

13. The non-transitory computer-readable storage medium of claim 8, wherein instructions for propagating the results of the plurality of server health check tasks to the plurality of data plane clusters further cause the one or more computer processors to performs steps comprising:

writing the received results of the plurality of server health check tasks to a queue, wherein each of the plurality of data plane clusters listens to changes written to the queue to update data stored in a DNS cache.

14. The non-transitory computer-readable storage medium of claim 8, wherein the received results of the server health check tasks of the one or more selected servers indicate whether each of the one or more selected servers is up or down.

15. A system, comprising:
a processor; and
non-transitory computer-readable storage medium storing instructions that when executed by one or more computer processors, cause the one or more computer processors to perform steps comprising:
identifying a plurality of servers, each server associated with a virtual server;
creating a plurality of server health check tasks, each server health check task for determining a measure of server health of a server with respect to a location, wherein the measure of server health is associated with a communication protocol for reaching the server from a computing device in the location;
dividing the plurality of server health check tasks into a sequence of a plurality of buckets of tasks;
monitoring health of the plurality of servers by repeating periodically, processing the plurality of server health check tasks within a time interval, the time interval comprising a plurality of time subintervals, the plurality of buckets of tasks processed in order of the sequence of the plurality of buckets of tasks, each bucket of tasks processed during a time subinterval assigned to the bucket, the processing comprising:

sending each server health check task to a worker process associated with the communication protocol, wherein the worker process determines the measure of server health of a server by communicating with the server using the communication protocol of the worker process, receiving results of the plurality of server health check tasks from the worker processes, and propagating the received results of the plurality of server health check tasks to a plurality of data plane clusters; and processing DNS queries requesting one or more servers for processing requests directed to a virtual server, the processing comprising selecting the one or more servers based on the received results of the plurality of server health check tasks.

16. The system of claim 15, wherein instructions for processing of the bucket further cause the one or more computer processors to performs steps comprising:

determining that one or more tasks of the bucket of tasks were unfinished at end of the time subinterval corresponding to the bucket of tasks; and adding the one or more tasks of the bucket of tasks to the bucket that is next in the sequence of buckets of tasks.

17. The system of claim 15, wherein the instructions further cause the one or more computer processors to performs steps comprising:

receiving a request associated with the virtual server identified by a uniform resource locator (URL), wherein the processed requests to the virtual server are processed by the one or more servers from the plurality of servers; and updating information stored in a database based on the request, wherein the database comprises records mapping virtual servers to servers.

18. The system of claim 15, wherein instructions for processing a DNS query received from a client device further cause the one or more computer processors to performs steps comprising:

identifying, based on information stored in a DNS cache, one or more candidate servers for the virtual server;

selecting, a particular server from the one or more candidate servers based on factors comprising a measure of the server health of the selected particular server, and a location associated with the client device; and providing a response identifying the particular server selected from the one or more candidate servers to the client device.

19. The system of claim 15, wherein the communication protocol associated with the measure of the server health of the server is one of tcp (transmission control protocol), http (hypertext transfer protocol), or https (hypertext transfer protocol secure), or icmp (internet control message protocol).

20. The system of claim 15, wherein instructions for propagating the results of the plurality of server health check tasks to the plurality of data plane clusters further cause the one or more computer processors to performs steps comprising:

writing the received results of the plurality of server health check tasks to a queue, wherein each of the plurality of data plane clusters listens to changes written to the queue to update data stored in a DNS cache.

* * * * *

UNITED STATES PATENT AND TRADEMARK OFFICE
CERTIFICATE OF CORRECTION

| | |
|---|---|
| PATENT NO. | : 12,095,852 B2 |
| APPLICATION NO. | : 18/222290 |
| DATED | : September 17, 2024 |
| INVENTOR(S) | : Shah et al. |

Page 1 of 1

It is certified that error appears in the above-identified patent and that said Letters Patent is hereby corrected as shown below:

In the Claims

In Column 17, in Claim 5, Line 67, delete "top" and insert -- tcp --, therefor.

Signed and Sealed this
Fourth Day of February, 2025

Coke Morgan Stewart
*Acting Director of the United States Patent and Trademark Office*